United States Patent [19]
>
> Thompson

[11] 4,147,809

[45] Apr. 3, 1979

[54] METHOD AND APPARATUS FOR SIZING AND FORMING DOUGH BODIES

[75] Inventor: Daniel T. Thompson, Pacific Palisades, Calif.

[73] Assignee: Thompson Bagel Machine Mfg. Corporation, Los Angeles, Calif.

[21] Appl. No.: 851,217

[22] Filed: Nov. 14, 1977

Related U.S. Application Data

[63] Continuation-in-part of Ser. No. 770,694, Feb. 22, 1977, abandoned.

[51] Int. Cl.² .................. A21D 6/00; A21C 11/00
[52] U.S. Cl. .................. 426/499; 425/288; 425/325; 425/364 B; 426/502; 426/503; 426/504
[58] Field of Search ............ 425/364 R, 364 B, 305.1, 425/307, 308, 309, 296, 297, 287, 288, 310, 311; 426/516, 517, 499, 503, 504, 502; 264/294

[56] References Cited

U.S. PATENT DOCUMENTS

| | | | |
|---|---|---|---|
| 1,839,180 | 12/1931 | Berger | 425/287 X |
| 2,126,416 | 8/1938 | Schlichter | 425/288 |
| 2,779,298 | 1/1957 | Chwirut et al. | 425/325 X |
| 3,052,196 | 9/1962 | Gilmore | 425/288 |
| 3,452,687 | 7/1969 | Kaneko et al. | 425/288 X |

FOREIGN PATENT DOCUMENTS

| | | | |
|---|---|---|---|
| 31214 | 1/1923 | Denmark | 425/309 |
| 239890 | 8/1969 | U.S.S.R. | 425/296 |

*Primary Examiner*—William R. Briggs
*Attorney, Agent, or Firm*—Poms, Smith, Lande, Glenny & Rose

[57] ABSTRACT

An apparatus for converting an unformed quantity of dough into a plurality of uniformly sized and shaped dough bodies has dough divider means for converting an unformed quantity of dough into at least one uniform ribbon of dough, moving the ribbon of dough through an outlet and severing the ribbon of dough into a plurality of uniformly sized pieces at an outlet of the dough divider; and dough forming means communicating with the dough divider means for engaging the ribbon of dough at the outlet of the dough divider means and drawing portions of the ribbon of dough away from the outlet in an initial drawing operation prior to severing the portion of dough from the ribbon of dough.

14 Claims, 43 Drawing Figures

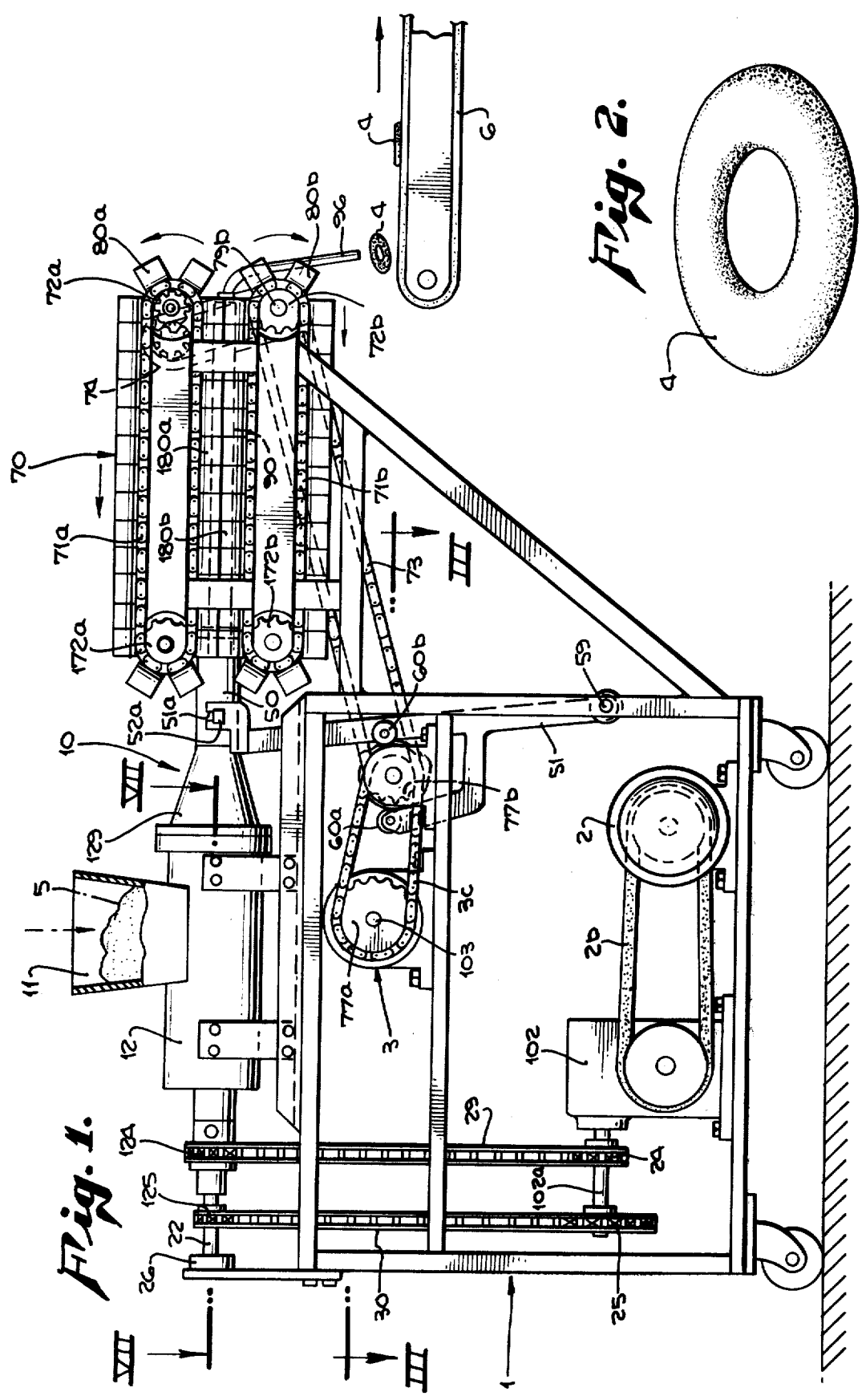

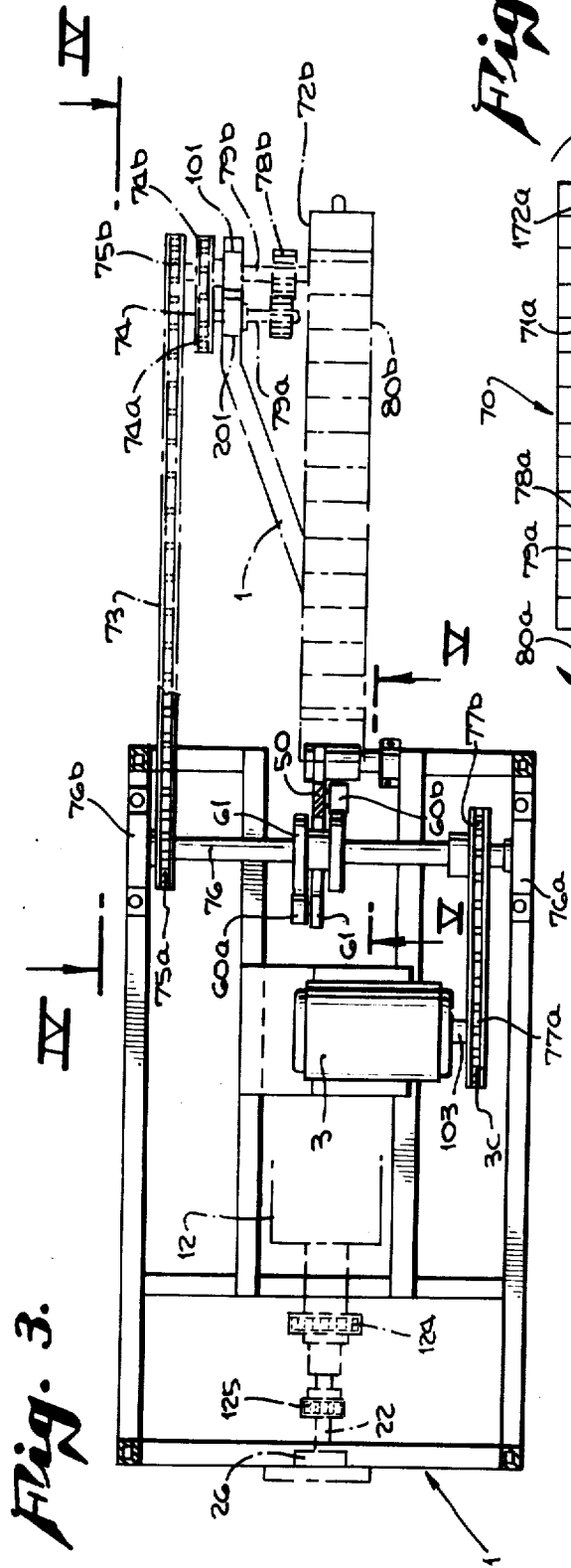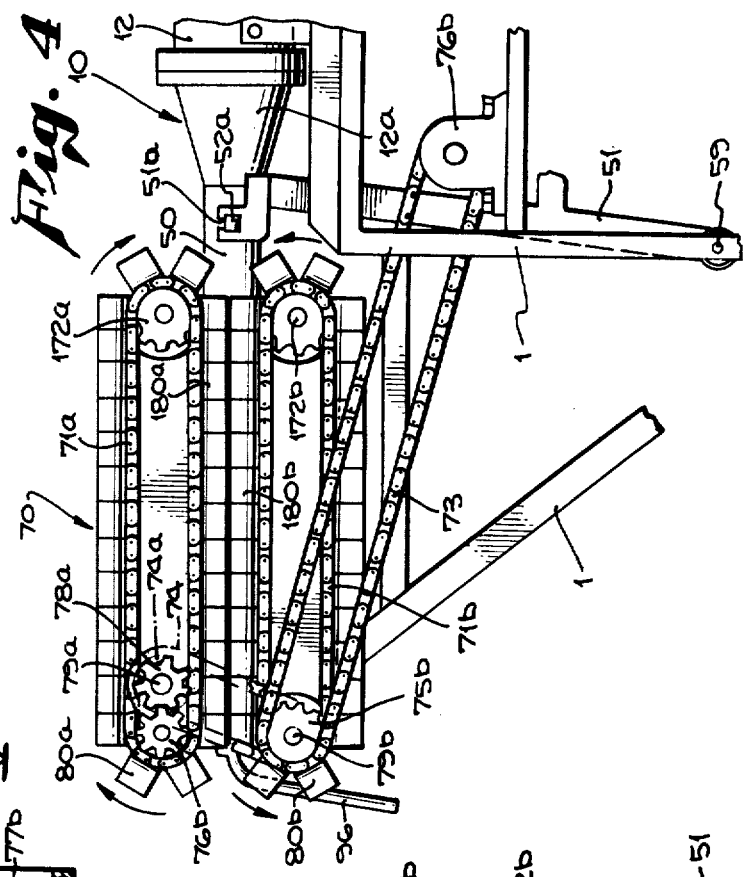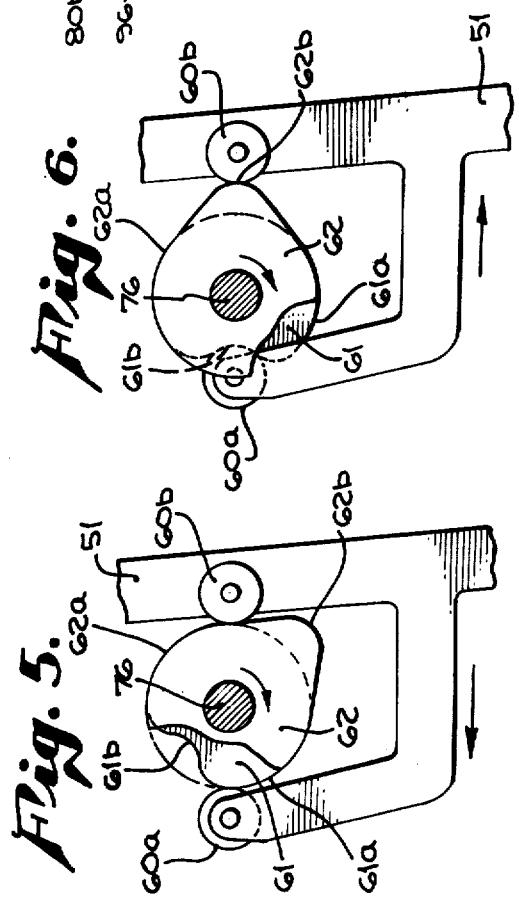

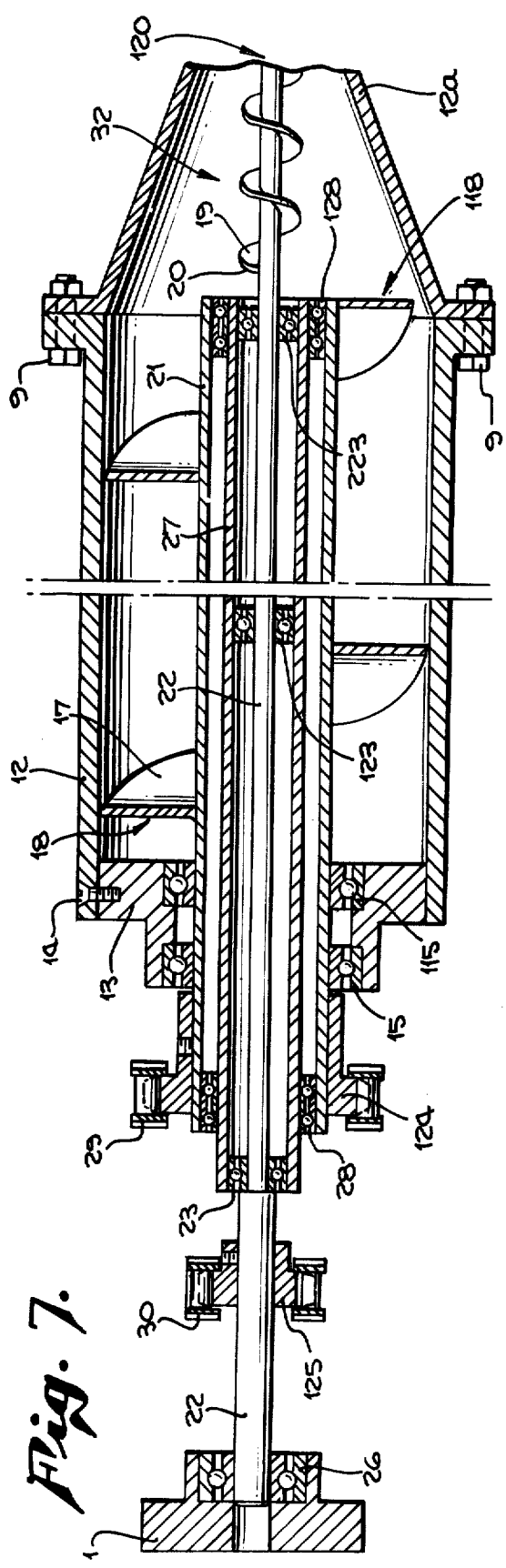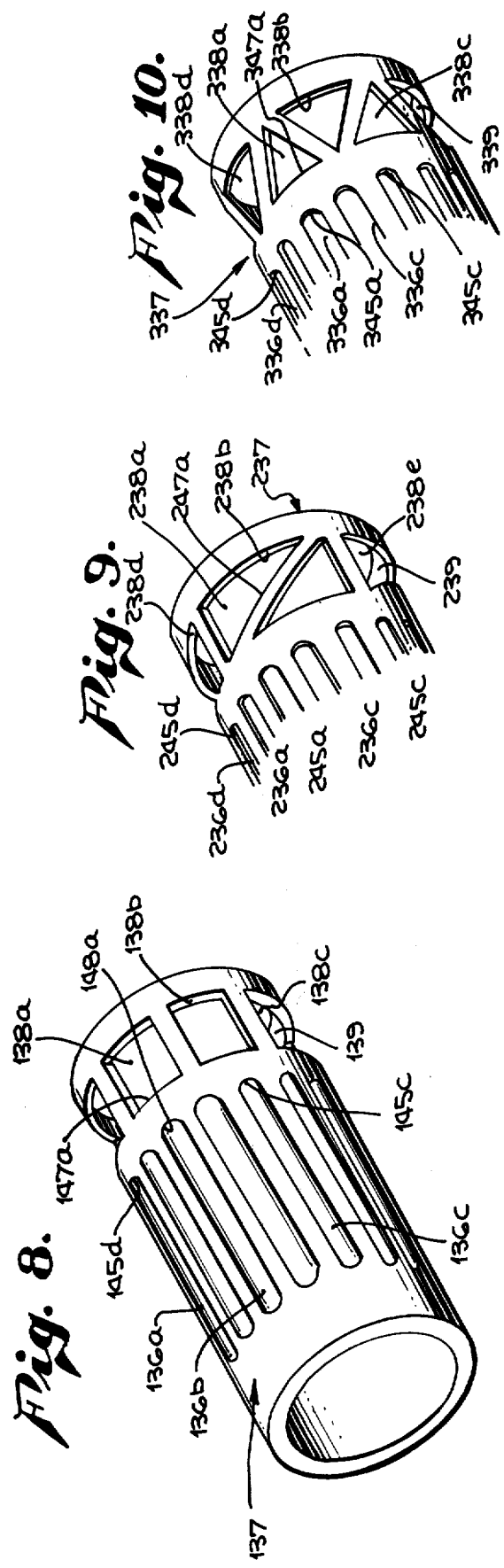

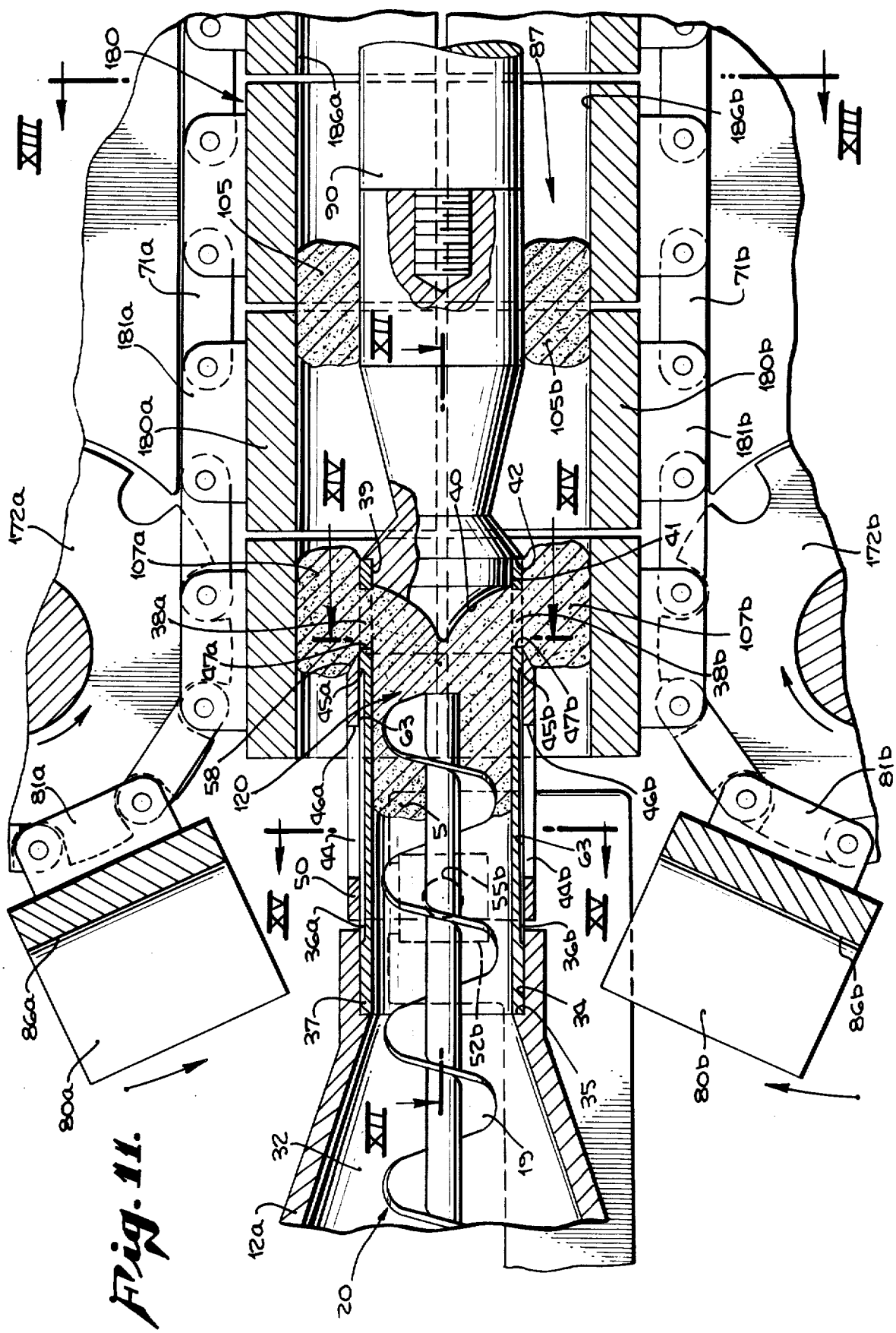

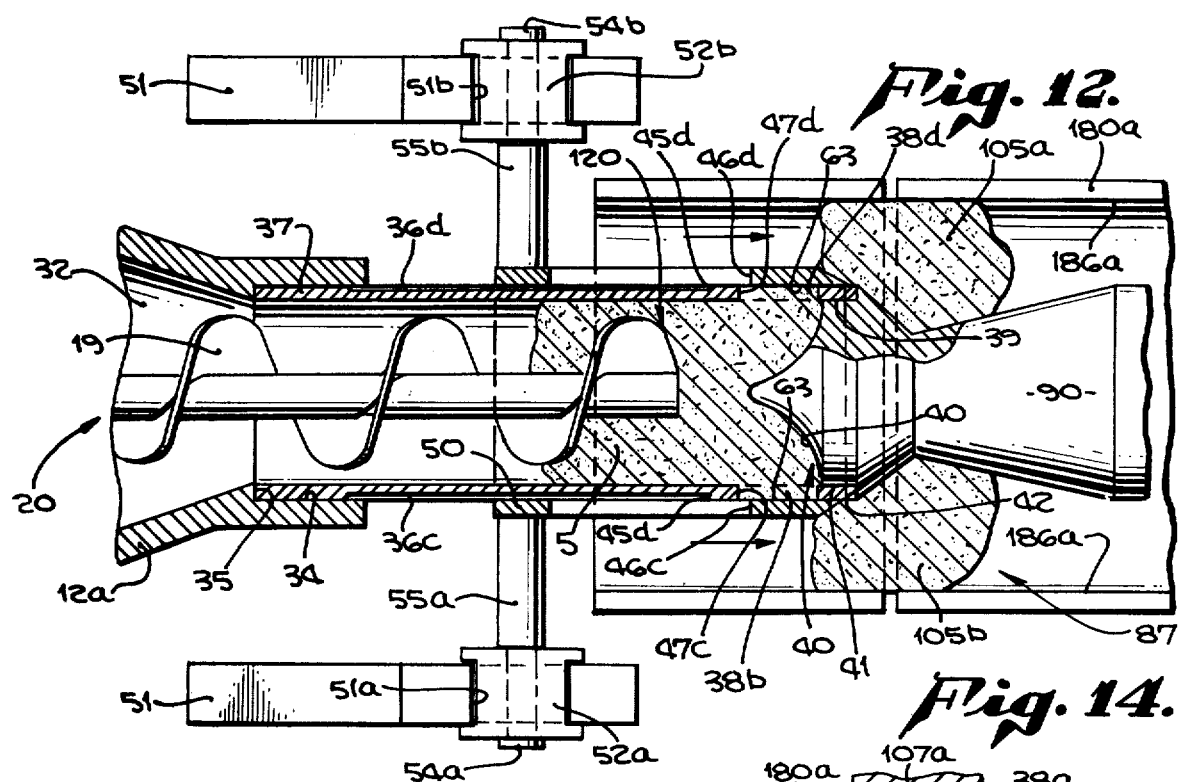
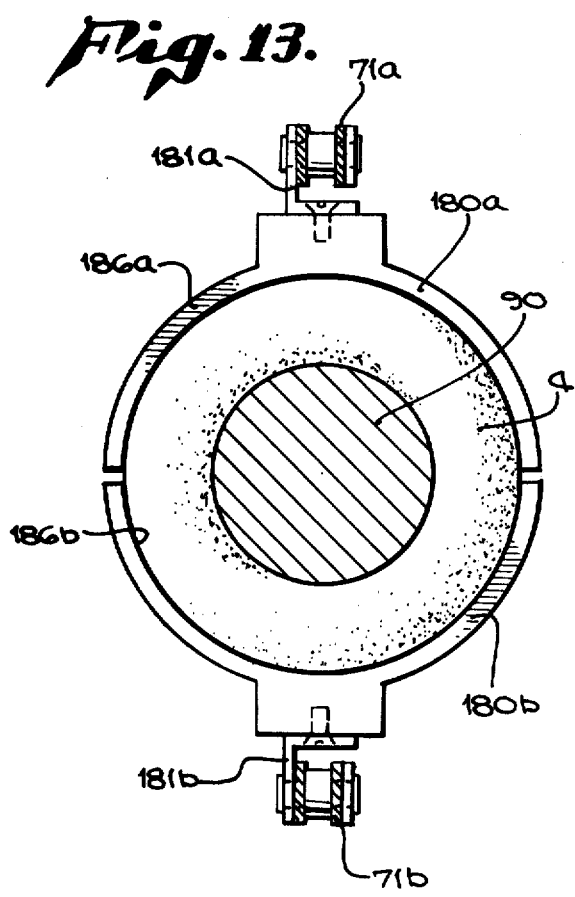
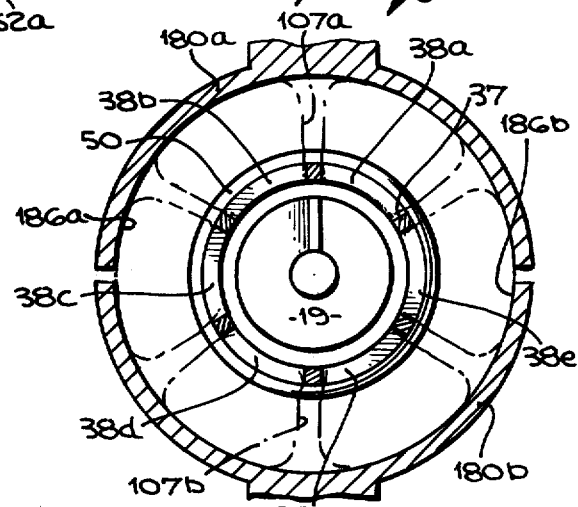
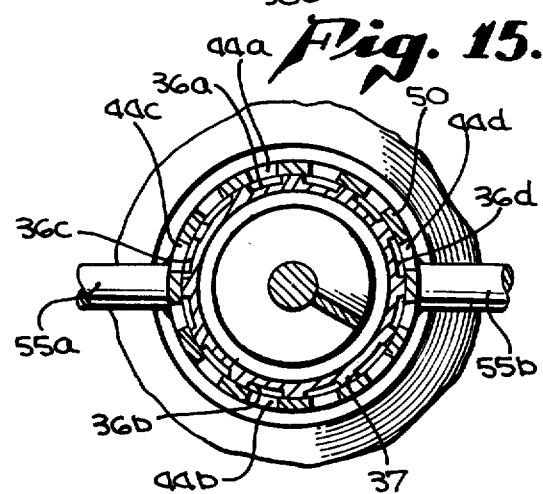

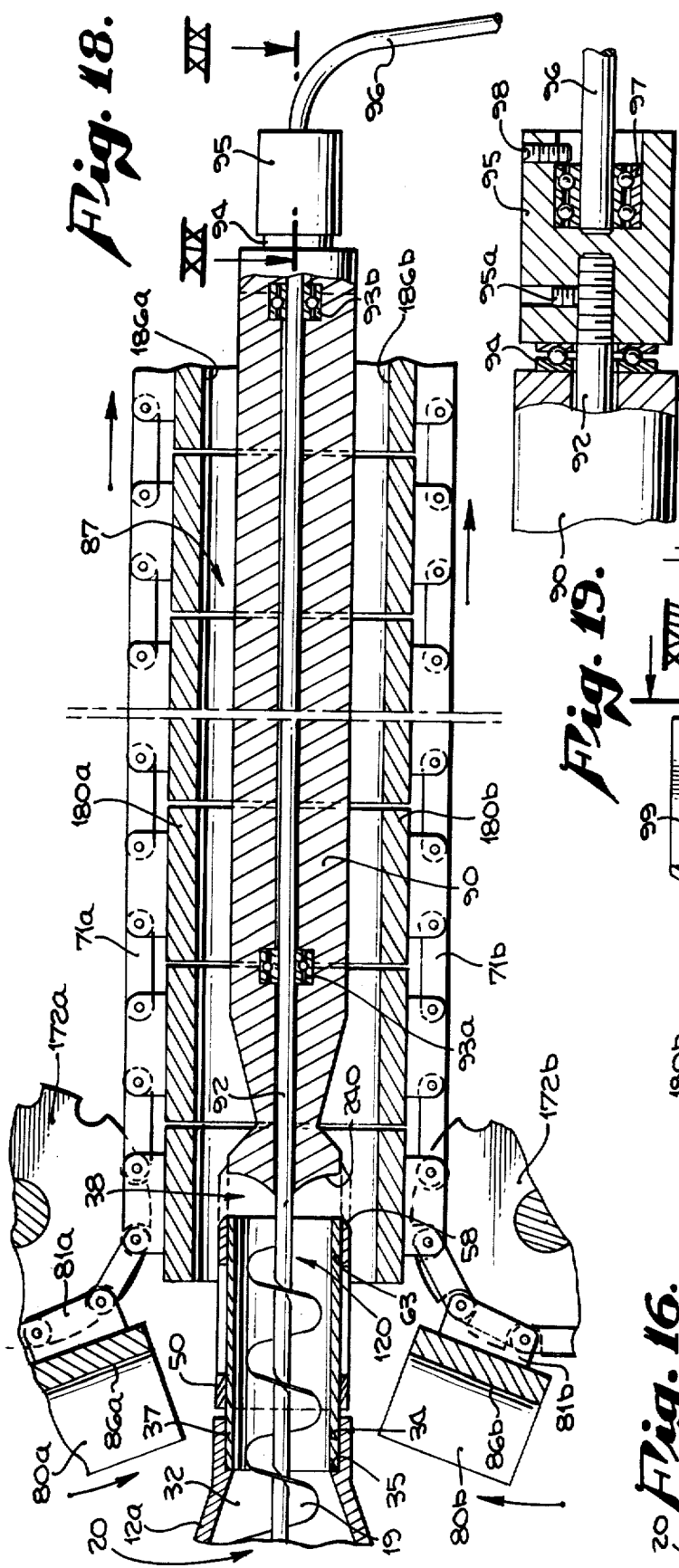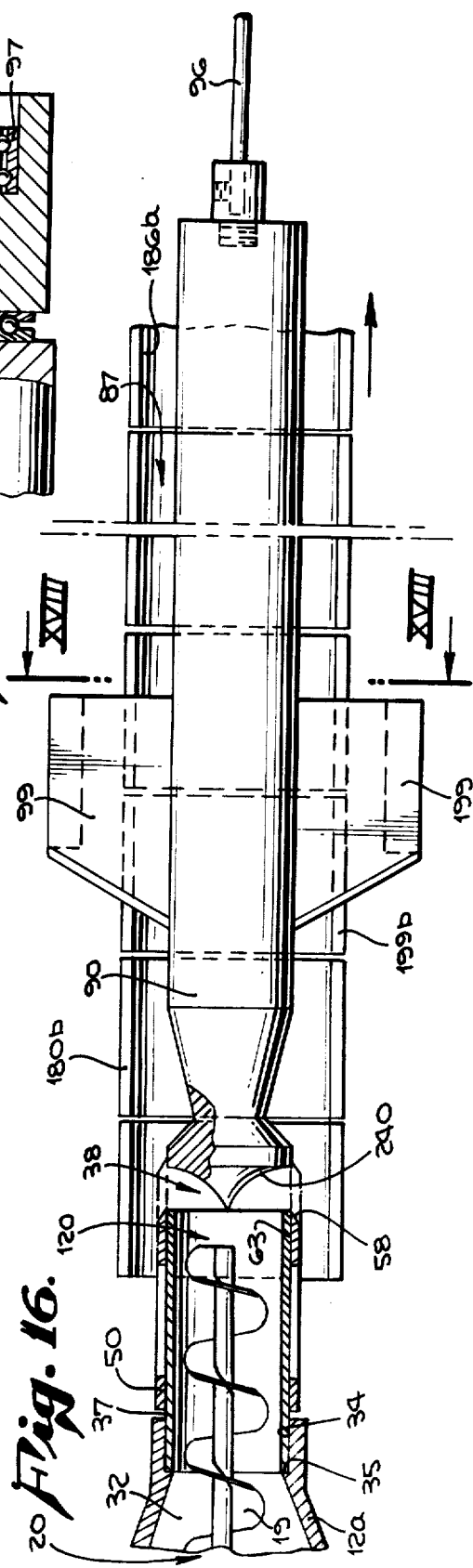

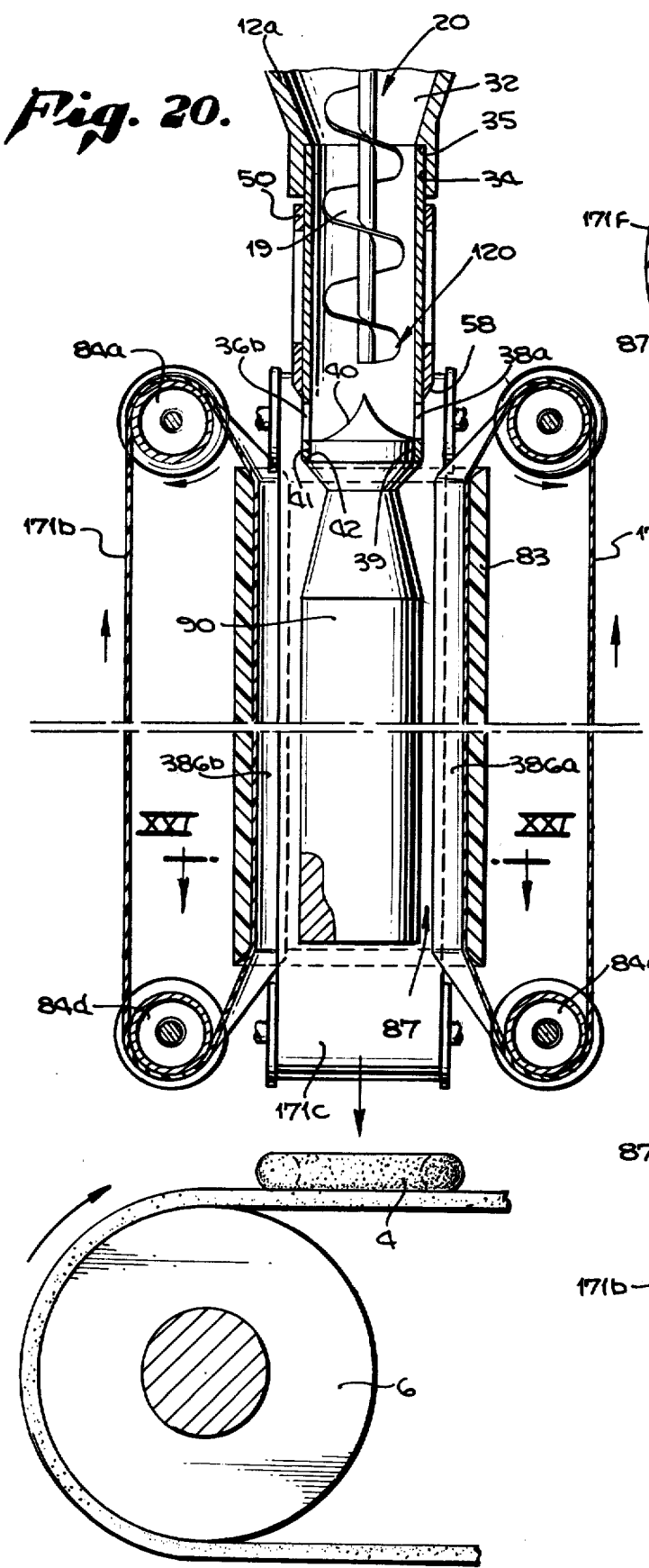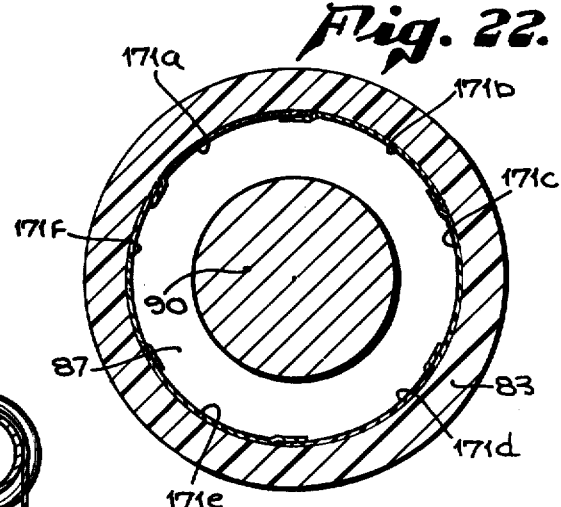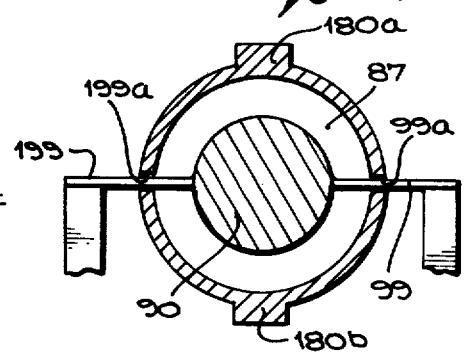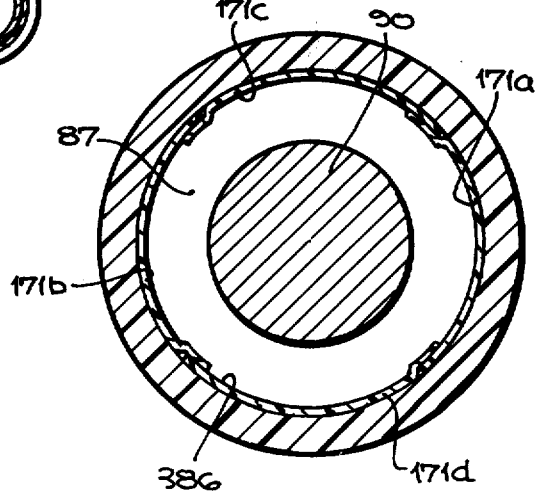

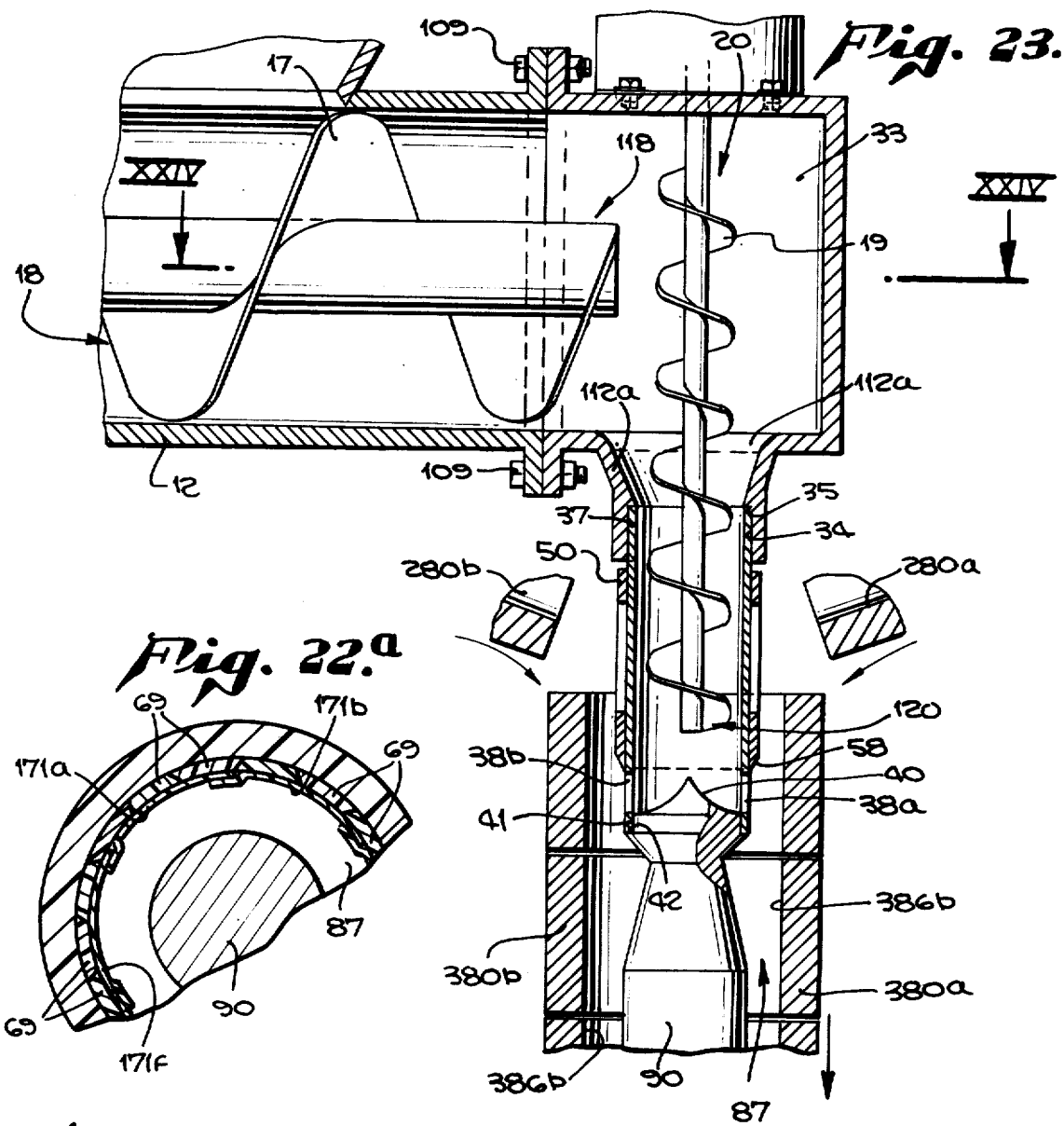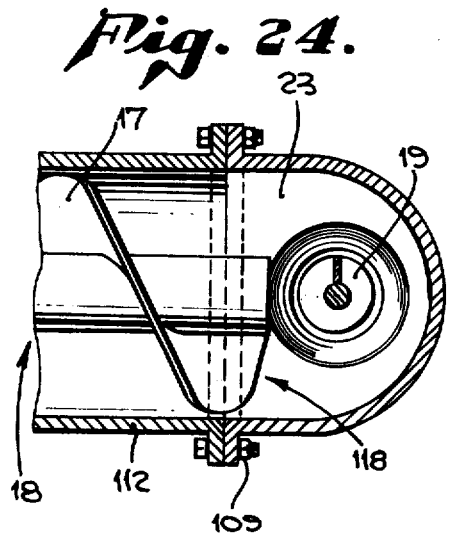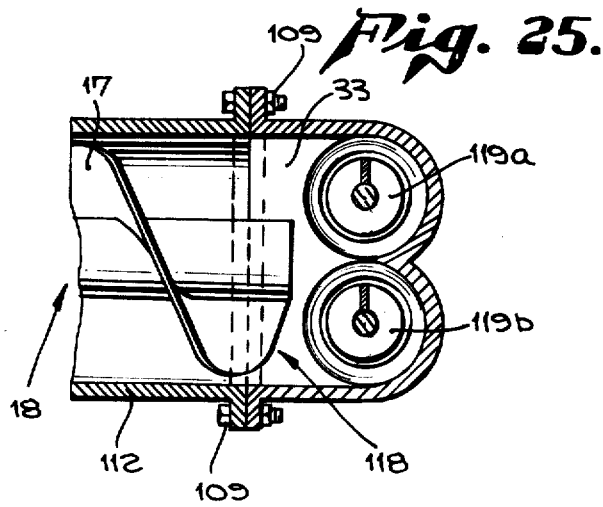

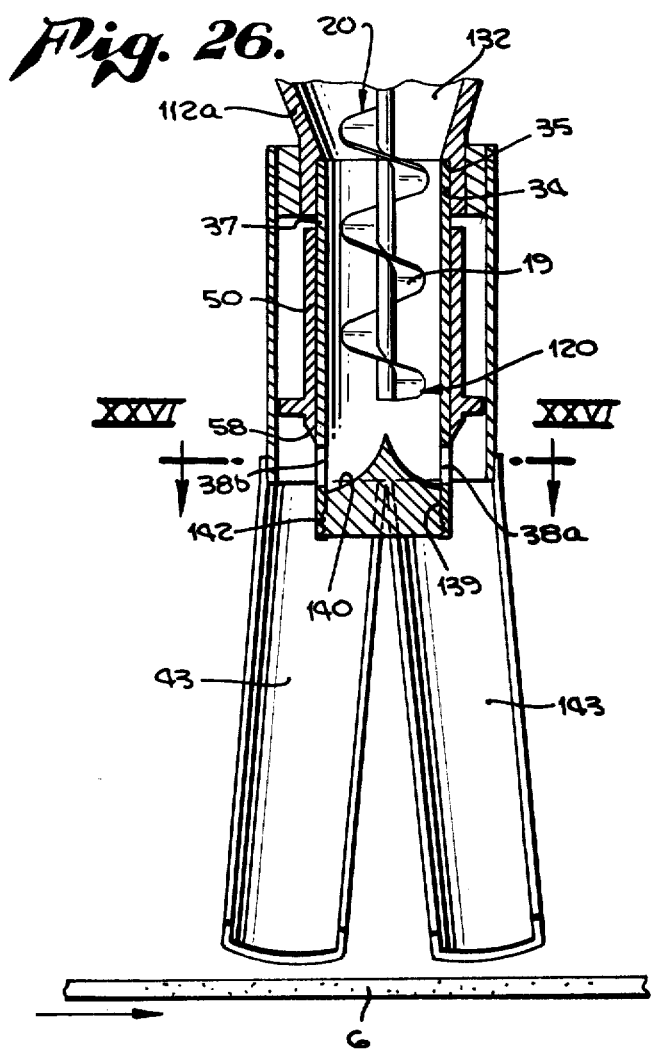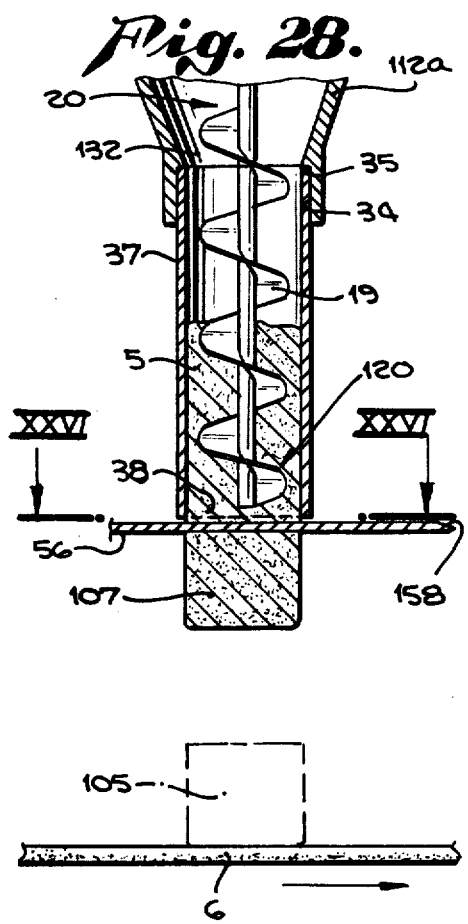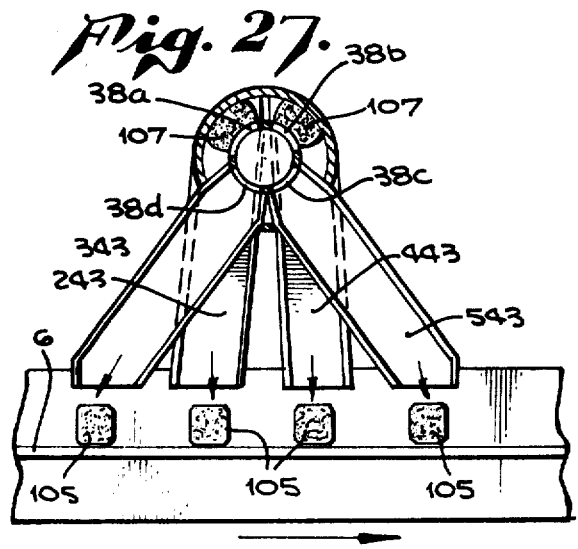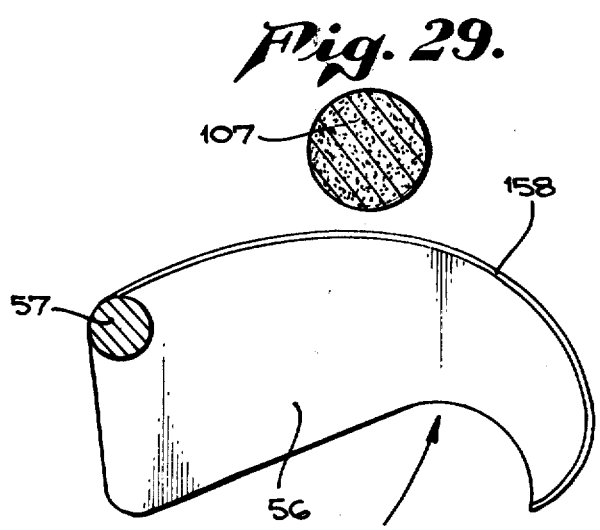

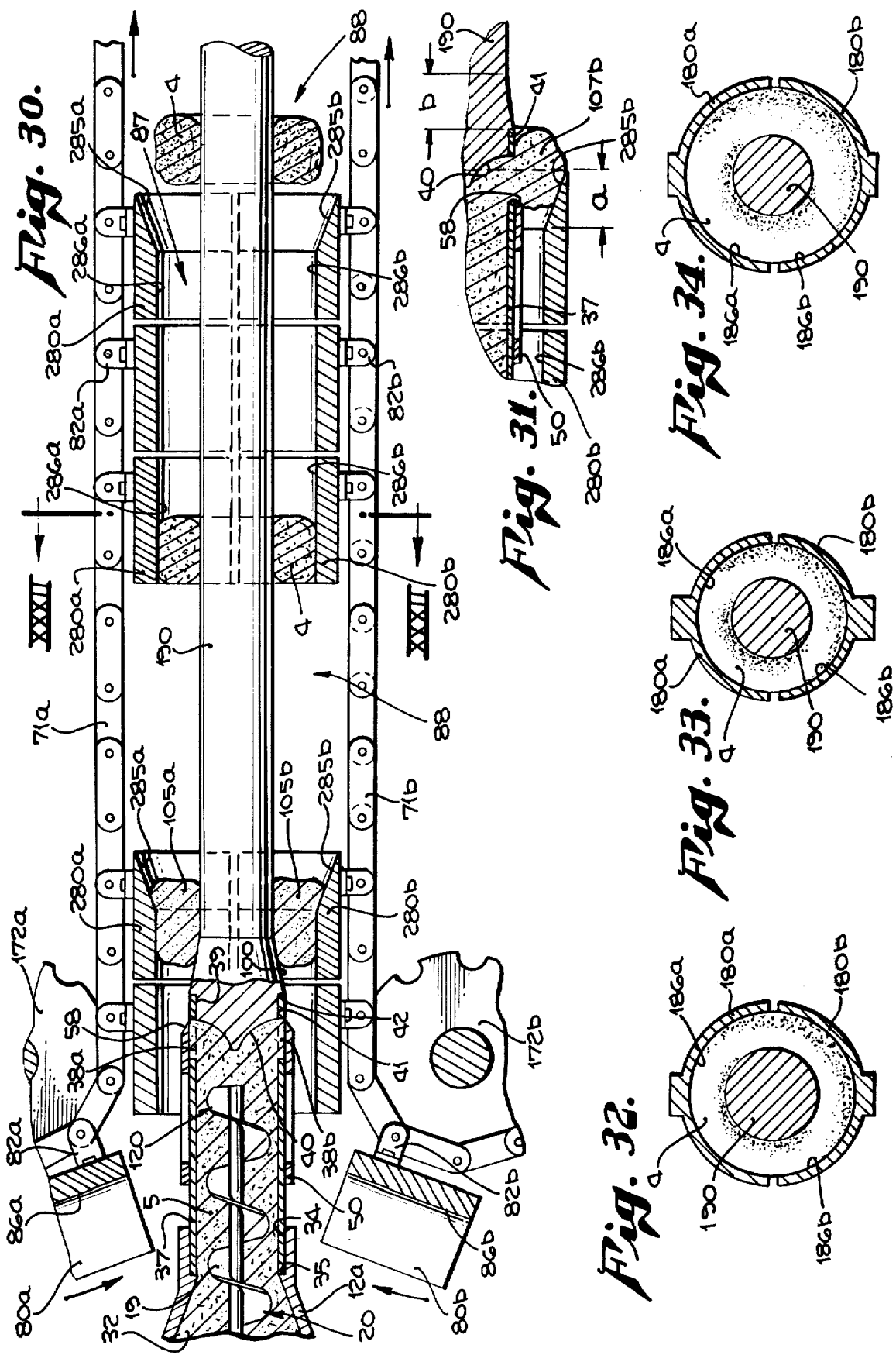

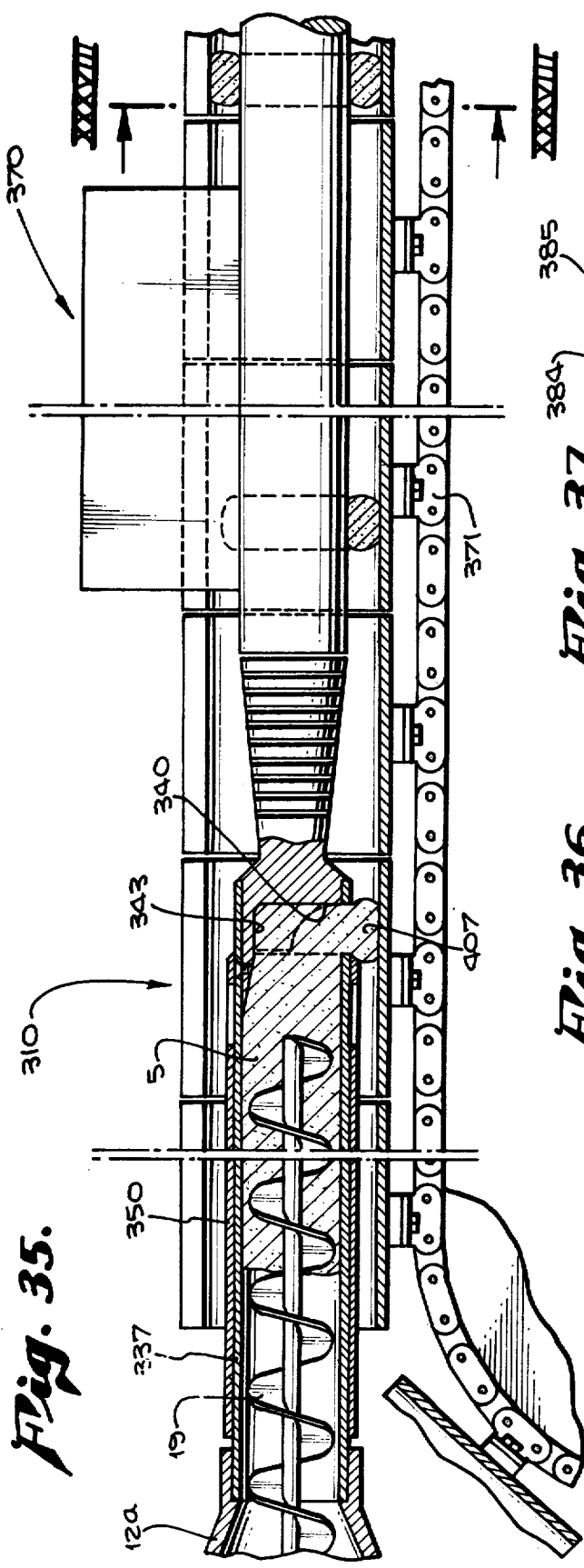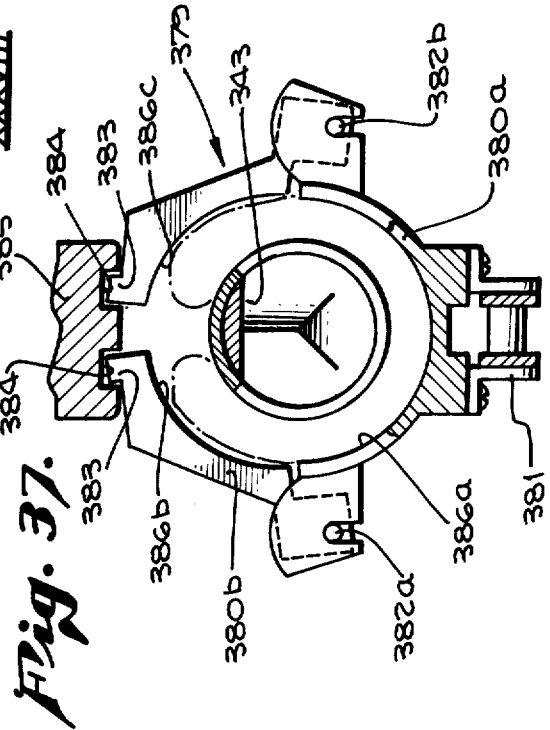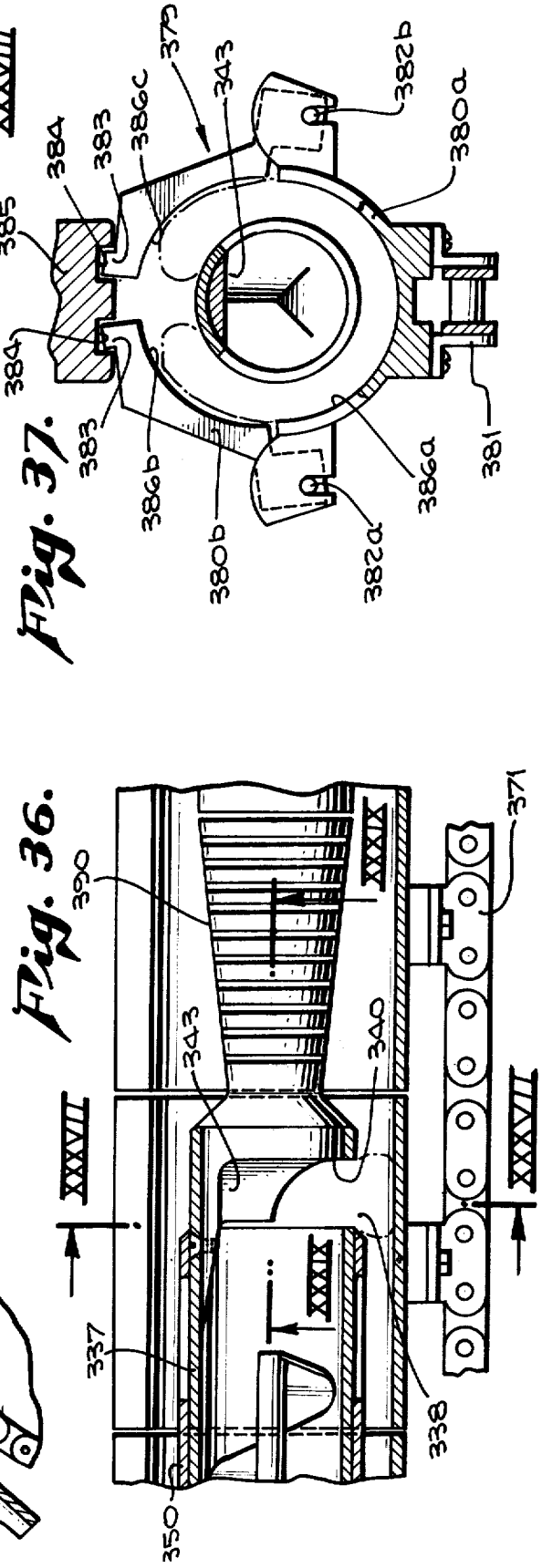

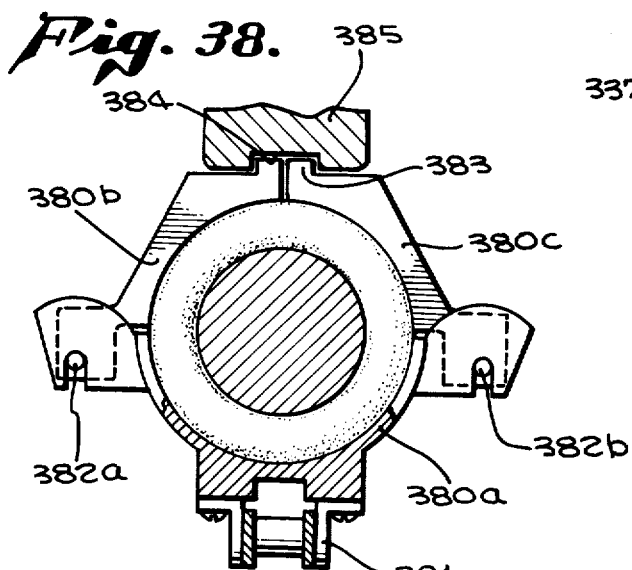
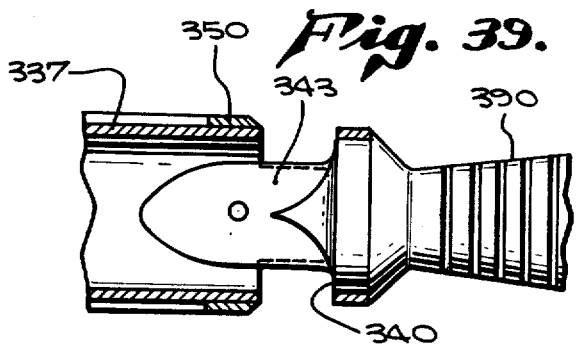
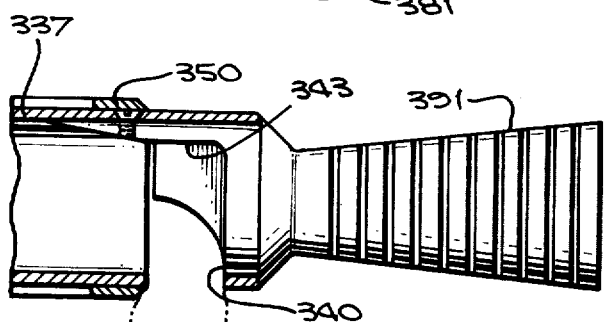
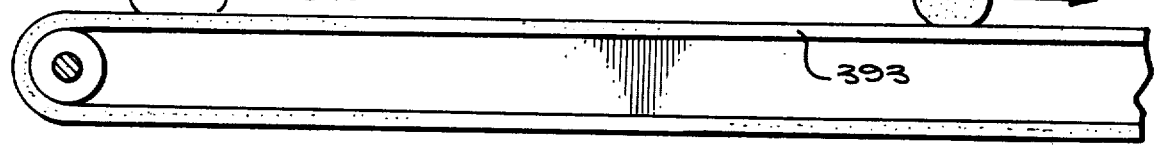
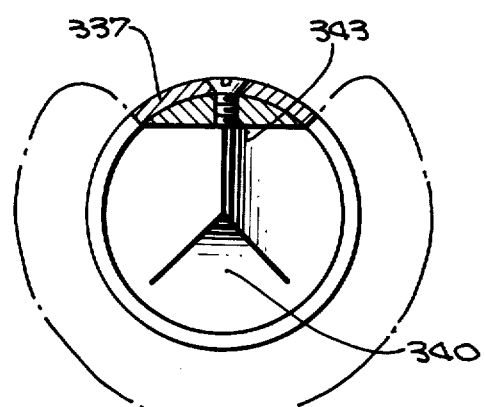
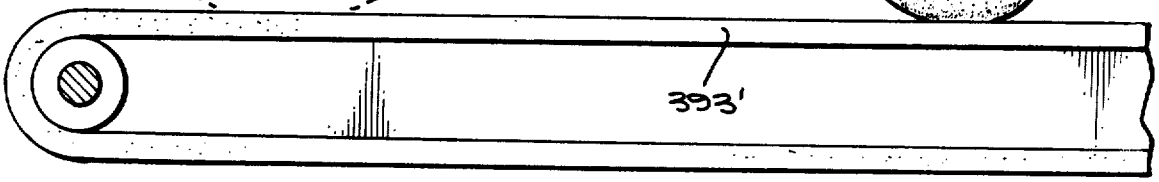

METHOD AND APPARATUS FOR SIZING AND FORMING DOUGH BODIES

PRIOR CASES

This is a continuation-in-part of application Ser. No. 770,694, filed Feb. 22, 1977 now abandoned.

BACKGROUND OF THE INVENTION

The present invention relates in general to an apparatus for converting an unformed quantity of a plasticly deformable substance, i.e. bagel dough, into a plurality of uniformly sized and shaped bodies having a generally toroidal configuration, i.e. bagels. More particularly, this invention relates to an improved apparatus capable of producing large quantities of uniformly sized and shaped bagels in a relatively short period of time without changing the inherent desirable qualities of the dough by over-working and punishing it.

Bagels are formed from a very heavy, tough and elastic dough. The finished bagel should be seamless and should be uniform in thickness. In forming the dough before baking it, the dough cannot be overworked, punished or kneaded excessively or it will not rise during the baking operation.

Prior art devices for sizing and shaping dough into bagels such as those shown in U.S. Pat. Nos. 3,407,754; 3,433,182; and 3,792,940 have utilized separate dough divider apparatus and dough forming apparatus in conjunction with a third device which transported the dough pieces, which have been separated from a generally unformed mass by the dough divider, from the dough divider to the dough forming apparatus.

Additionally, these prior art devices have relied on at least a minimal pre-forming operation on the dough prior to the actual bagel forming operation. As any kneading and working of the bagel dough during bagel forming is cumulative, the pre-forming operation increases the chances that the bagel dough will be overworked and kneaded excessively during the total bagel forming operation, thereby interferring with the capability of the dough to rise during baking.

Further, with respect to the dough forming operation, the prior art devices have utilized a single conveyor which circumferentially defines a forming zone generally about a forming mandrel. In these prior art devices, the dough piece is placed into the forming zone between the mandrel and the conveyor which is moving relative to the mandrel and is rolled, kneaded and worked until it has extended circumferentially around the mandrel. The use of a single conveyor has necessitated the use of a generally complex conveyor apparatus and further, has resulted in excessive kneading and over-working of portions of the dough.

A further prior art device as shown in U.S. Pat. No. 3,799,726, has utilized a dual conveyor comprising a generally wide belt which operates in conjunction with a moving forming die which defines generally one-half the circumference of the forming zone and which is mounted to a second conveyor. The relatively wide belt is passed through a stationery belt deflector which distorts the generally planar belt into a trough-like configuration to define the other half of the forming zone.

In all these prior art references, the dough is worked continuously by the dough forming apparatus and, by virtue of the fact that these prior art devices utilize a single piece of dough which is manipulated until it has elongated sufficiently to extend completely around the forming mandrel, tend to further over-work, punish and excessively knead the bagel dough which again increases the risk that it will not rise properly during baking.

SUMMARY OF THE INVENTION

Therefore, it is a primary object of the present invention to disclose and provide an apparatus for converting an unformed quantity of dough into a plurality of uniformly sized and shaped dough bodies which has a dough divider for converting an unformed quantity of dough into a plurality of uniformly sized pieces at an outlet of the divider and dough forming means communicating with the dough divider for engaging the dough at an outlet of the divider thereby eliminating any separate dough transporting and pre-forming apparatus.

It is a further object of the present invention to disclose and provide a dough forming apparatus which comprises a plurality of cooperating generally opposed dough manipulating conveyors which manipulate the dough uniformly with a minimum amount of kneading into the desired toroidal shape.

It is a further object of the present invention to disclose and provide an apparatus wherein the dough forming movement between the dough manipulating conveyors and the mandrel is interrupted for a portion of each complete cycle of the conveyors to rest the dough and prevent over-working the dough.

A further object of the present invention is to disclose and provide an apparatus which accomplishes the prior objects and which is, at the same time, relatively less complex, and more durable than prior devices.

Other objects and advantages of this invention will be readily apparent from the following detailed description of exemplary embodiments taken in conjunction with the appended drawings which will first be discussed briefly.

BRIEF DESCRIPTION OF THE DRAWINGS

FIG. 1 is a side elevation of a preferred exemplary embodiment of an apparatus for converting an unformed quantity of dough into a plurality of uniformly sized and shaped dough bodies, such as bagels, in accordance with the present invention.

FIG. 2 is a perspective showing the toroidal configuration of a bagel made by the apparatus of FIG. 1.

FIG. 3 is a plan view through the plane III—III of FIG. 1 showing the interrelationship between the drive elements of the dough forming portion of the apparatus.

FIG. 4 is a side view through the plane IV—IV of FIG. 3 showing in detail the arrangement of drive chains, sprockets, and gears which operate the dough forming portion of the apparatus.

FIG. 5 is a view through the plane V—V of FIG. 3 showing in detail the cam and cam followers which operate the cut-off means of a dough divider apparatus which is associated with the dough forming apparatus.

FIG. 6 is a detail view which, when considered in conjunction with FIG. 5, shows how a reciprocating operation of the cut-off means is achieved.

FIG. 7 is a sectional view through the plane VII—VII of FIG. 1 showing the interrelationship between primary and secondary dough feed elements and showing, in particular, a manner of coaxially aligning the dough feed elements and for allowing the elements to rotate independently of each other.

FIG. 8 is a perspective view of an interchangeable cylindrical extrusion body having extrusion ports for allowing dough to be extruded from the extrusion body under the influence of the primary and secondary feed elements.

FIGS. 9 and 10 are partial perspective views of interchangeable extrusion bodies having extrusion ports of different shapes for producing extruded dough ribbons having different cross-sectional shapes.

FIG. 11 is a partial side-sectional view showing in detail the interaction between the dough dividing and the dough forming portions of the apparatus of FIG. 1.

FIG. 12 is a partial sectional view through the plane XII—XII of FIG. 11, showing in detail the interrelationship between the dough divider portion of the apparatus with its associated cut-off means and the dough forming portion of the apparatus of FIG. 1.

FIG. 13 is a partial sectional view through the plane XIII—XIII of FIG. 11.

FIG. 14 is a sectional view through the plane XIV—XIV of FIG. 11 showing a plurality of dough ribbons being extruded from a plurality of extrusion ports into the dough forming zone.

FIG. 15 is a partial sectional view through the plane XV—XV of FIG. 11.

FIG. 16 is a plan view showing a first alternative exemplary embodiment of the apparatus of the present invention wherein the mandrel is supported by separate mounting means which project externally from the dough forming zone.

FIG. 17 is a sectional view through the plane XVII—XVII of FIG. 16.

FIG. 18 is a side-sectional view of a second alternative exemplary embodiment of apparatus according to the present invention showing means for rotatably mounting the mandrel within the dough forming zone.

FIG. 19 is a side-sectional detail view through the plane XIX—XIX of FIG. 18.

FIG. 20 is a side-sectional view of a generally vertically positioned third exemplary apparatus which utilizes relatively wide conveyor belts of a relatively flexible material for defining the dough forming zone and for manipulating the dough along the mandrel.

FIG. 21 is a sectional view through the plane XXI—XXI of FIG. 20 showing overlapping conveyor belts which define a closed dough forming zone about a central coaxially aligned mandrel.

FIG. 22 shows a fourth exemplary embodiment of an apparatus as in FIG. 21 which differs only in the number of overlapping conveyor belts used to define the dough forming zone.

FIG. 22a is a partial sectional view showing inserts which vary the diameter of the forming zone.

FIG. 23 is a side-sectional view of a fifth exemplary embodiment of apparatus according to the present invention which utilizes primary and secondary feed elements which are not coaxially aligned and an associated vertically positioned dough forming apparatus.

FIG. 24 is a plan view through the plane XXIV—XXIV of FIG. 23.

FIG. 25 corresponds to FIG. 24 and shows an embodiment which utilizes dual secondary feed elements.

FIG. 26 is a partial sectional view of a further alternative exemplary embodiment of dough divider apparatus according to an aspect of the present invention which directs a plurality of severed generally uniform pieces of dough to an output conveyor.

FIG. 27 is a section view taken in FIG. 26 along the plane XXVII—XXVII.

FIG. 28 is a side-sectional view of a still further alternative exemplary embodiment of dough divider which utilizes a rotating cut-off blade.

FIG. 29 is taken through the plane XXIX—XXIX of FIG. 28 and shows the operation of the rotating cut-off blade.

FIG. 30 is a side-sectional view of another exemplary embodiment of apparatus for converting an unformed quantity of dough into a plurality of uniformly sized and shaped dough bodies, such as bagels, according to the present invention which utilizes modified forming die body elements arranged in a discontinuous series and a two-diameter forming mandrel to provide a relative dough forming movement between the modified forming die body portions and the modified mandrel while, at the same time, preventing over-working the bagel dough during the bagel forming process.

FIG. 31 is a sectional detail view of the apparatus of FIG. 30.

FIG. 32 is a sectional view through the plane XXXII—XXXII of FIG. 30.

FIGS. 33 and 34 are cross-sectional views as FIG. 32 that show how, by varying the diameter relationships between the mandrel and the zone defined by the forming die body portions, the finished size of the bagel may be varied.

FIG. 35 is a side-sectional view of yet another alternative exemplary embodiment of apparatus according to the present invention showing a mandrel adapted to produce semiannular shaped dough bodies for subsequent forming into a variety of shapes.

FIG. 36 is a more detailed side-sectional view of the extrusion point of the apparatus of FIG. 35.

FIG. 37 is an end view of the mandrel employed in the apparatus of FIG. 35 as seen from the plane XXXVII—XXXVII of FIG. 36.

FIG. 38 is an end view of the apparatus of FIG. 35 in the plane XXXVIII—XXXVIII showing the forming of annular dough bodies.

FIG. 39 is a bottom-section view of the forming face of the mandrel in the apparatus of FIG. 35.

FIG. 40 is a simplified side view of the urging means of the apparatus of FIG. 35 cooperating with forming means adapted to produce rod shaped dough bodies.

FIG. 41 shows a rod shaped dough body as produced by the apparatus of FIG. 40.

FIG. 42 is a simplified end view from in front of the forming face of the mandrel of FIG. 35 cooperating with forming means adapted to produce disc shaped dough bodies.

DETAILED DESCRIPTION OF AN EXEMPLARY EMBODIMENT

Referring initially to FIG. 1, an apparatus for converting an unformed quantity of dough into a plurality of uniformly sized and shaped dough bodies is shown. The exemplary embodiment shown is intended to produce uniformly sized toroidal dough bodies, i.e. bagels, as shown at 4 and in FIG. 2.

An apparatus support frame 1 mounts dough divider means, shown generally at 10, and dough forming means, shown generally at 70, such that dough forming means 70 communicates with the dough divider means 10 and engages ribbons of dough at an outlet of the dough divider means.

Dough divider means 10 comprises an external housing 12 having an inlet 11 for introducing dough, bagel dough in the exemplary embodiment, into the dough divider.

Dough divider means 10 comprises a plurality of feed elements, primary feed element 17 and secondary feed element 19 as shown in the exemplary embodiment of FIG. 7, arranged in series to progressively act upon the unformed bagel dough 5 to move the dough from inlet 11 to an outlet of the dough divider means.

As shown in FIG. 7, primary feed element 17 and secondary feed element 19 are feed screws internal of housing 12 and the converging frustoconical portion 12a at an outlet in thereof. Primary feed element 17 and secondary feed element 19 compact the bagel dough into a mass of uniform density and then extrude the uniformly compacted mass into a confined zone at an outlet of dough divider means 10. As is readily apparent, primary feed element 17 and secondary feed element 19 comprise cylindrical helical feed screws which are arranged in a sequential series decreasing seriatim in diameter as the series progresses from primary feed element 17 proximate inlet 11 of dough divider means 10.

Means are provided for mounting the sequential series of feed screws in coaxial alignment. As is best seen in FIG. 7, primary feed element 17 is journaled in, aligned and supported by bearings 15 and 115 which are mounted in end plate 13 of external housing 12. End plate 13 may be fastened to external housing 12 in any one of several known ways, such as by set screw 14.

Shaft 22 of secondary feed element 19 is journaled in, aligned and supported by bearings 23, 123, and 223 which are mounted within secondary housing 27. Secondary housing 27 is, in turn, journaled in, aligned and supported by bearings 28 and 128 which are mounted within tubular primary shaft 21.

In thus mounting primary feed element 17 and secondary feed element 19, the feed elements are rotatably mounted within external housing 12 and converging frustoconical portion 12a thereof and, at the same time, are independently rotatable with respect to each other.

In the exemplary embodiment shown in FIGS. 1 and 7, drive control means are shown for regulating the rate of operation of each individual feed element relative to an adjacent element, primary feed element 17 and secondary feed element 19 in the exemplary embodiment, to assure an adequate supply of dough 5 and prevent excessive compaction and over-working of the dough at an upstream end of any individual element, end 20 of secondary feed element 19 as shown in FIG. 7.

Drive motor 2 for dough divider 10 is connected by means of drive belt 2b to speed reducing transmission 102 as may be seen in FIG. 1. Output shaft 102a of speed reducing transmission 102 non-rotatably mounts sprockets 24 and 25 which are, in turn, connected to and which drive sprockets 124 and 125 by means of primary drive chain 29 and secondary drive chain 30 respectively.

Referring now to FIG. 7, sprocket 124 is non-rotatably mounted to primary shaft 21 of primary feed element 17. Sprocket 125 is also non-rotatably mounted to shaft 22 of secondary feed element 19. Also, in the exemplary embodiment shown in FIG. 7, shaft 22 is extended beyond sprocket 125 and a terminal portion thereof is journalled in bearing 26 which is mounted to an extension of support frame 1.

As has been discussed prior, primary feed element 17 and secondary feed element 19 are independently rotatable with respect to each other. The relative rate of rotation between the primary feed element and the secondary feed element may be easily controlled at an optimum value by selecting sprocket pairs 24/124 and 25/125 such that a desired speed reduction occurs between transmission 102 and feed elements 17 and 19.

The relative rate of rotation between primary feed elements 17 and secondary feed elements 19 which will provide an adequate supply of dough 5 at an upstream end 20 of secondary feed element 19 and, at the same time, prevent over-working and punishing the bagel dough is determined by the relative cross-sectional area and thread pitch of cylindrical helical feed screws 17 and 19 respectively. As an example, a primary cylindrical helical feed screw 17 having a working cross-sectional area of 4 square inches and a thread pitch of one turn in two linear inches, when used in conjunction with a secondary cylindrical helical feed screw 19 having a cross-sectional area of 1 square inch and a thread pitch of 1 turn in one linear inch, would require a relative rate of rotation of 1:4 between primary cylindrical helical feed screw 17 and secondary cylindrical helical feed screw 19.

Although the preferred exemplary embodiment of the present invention discussed above utilizes a sequential series of coaxially aligned feed elements, it should be noted that the present invention might effectively utilize primary and secondary feed elements which are not coaxially aligned. Referring to FIGS. 23, 24, and 25, exemplary embodiments which utilize primary and secondary feed elements arranged perpendicular to each other are shown.

As dough is moved from upstream end 18 to downstream end 118 of primary feed element 17, it is forced into a restricted zone 33 adjacent the upstream end 20 of secondary feed element 19. Under the influence of secondary feed element 19, the dough is forced into confined zone 112a and then through interchangeable body means 37 past downstream end 120 of secondary feed element 19 and finally out extrusion ports 38a and 38b.

The exemplary embodiment shown in FIG. 25 differs from the exemplary embodiment shown in FIGS. 23 and 24 in that it utilizes two secondary feed elements 119a and 119b. In this exemplary embodiment, the relative rate of rotation of secondary feed elements 119a and 119b with respect to primary feed element 17 will be one half the relative rate of rotation which is required of secondary feed element 19 which is exemplified in FIGS. 23 and 24.

Under the influence of primary feed element 17 and secondary feed element 19 which progressively act upon the dough 5 to move the dough from inlet 11 through dough divider 10 to an outlet thereof, the dough is converted into at least one uniform ribbon of dough and is moved through the outlet. Port means 38a and 38b, as shown in FIG. 11, allow the dough to exude from the dough divider in at least one uniform ribbon of dough. Ribbons of dough 107 and 107a are shown in FIG. 11.

Additionally, means 34 are provided for releasably mounting port means 38a and 38b with respect to dough divider means 10. In the exemplary embodiments of FIGS. 11, 13, 16, 18, 20, 23, 26, 28, and 30, interchangeable body means 37 are provided for being selectively mounted to dough divider means 10 for varying port means 38a and 38b to provide selectively variable cross-sectional areas and shapes for ribbon of dough 107a and 107b which is exuded through ports 38a and 38b.

Referring specifically to FIG. 11, interchangeable body means 37, having extrusion ports 38a and 38b, is inserted into internal bore 34 of converging frustoconical portion 12a of external housing 12 of dough divider means 10. Abuttment shoulder 35 limits the travel of interchangeable body means 37 which is retained by a friction tight fit and conventional set screws within internal bore 34.

Various embodiments of interchangeable body means 37 are shown at 137, 237, and 337 of FIGS. 8, 9, and 10 respectively. Interchangeable body means 137, 237 and 337 of the exemplary embodiment of the present invention are generally cylindrical and are provided with circumferentially positioned extrusion ports inter alia, 138a/138c, 238a/238c, and 338a/338c respectively. The circumferentially portioned extrusion ports are located generally at an outlet portion of the interchangeably body and, as bagel dough is forced through the circumferentially position extrusion ports, ribbons of dough having a uniform cross-sectional area and shape are directed generally radially from the extrusion ports as is indicated in FIG. 14.

In order to obstruct a downstream distal portion of the cylindrical interchangeably body 37, diverter means 40 is provided. As best seen in FIG. 12, diverter means 40 is provided with an annular relief 41 and an abuttment shoulder 42. Annular relief 41 is fitted into an internal surface 39 at a downstream distal end of cylindrical interchangeable body 37 in a friction tight press fit with four conventional retaining set screws (not shown). Abuttment shoulder 42 limits the travel of diverter means 40 by abutting against cylindrical interchangeably body 37. Additionally, as may be seen in FIG. 26 a diverter shown at 140 may be provided with abuttment threads 142 which are threaded into an internal surface 139 to retain diverter means 140 within cylindrical interchangeable body 37 more securely than is generally possible with a friction-tight press fit.

A further embodiment of the diverter means of the present invention is shown at 240 in FIGS. 16 and 18. As may be seen, diverter means 240 is positioned outside of and coaxially aligned with cylindrical interchangeable body 37 at the downstream distal end thereof. Dough being exuded through interchangeable body 37 contacts diverter means 240 and is again directed radially from a generally axial flow, even though diverter means 240 does not directly contact cylindrical interchangeable body 37.

Referring once again to FIG. 11, once the ribbon of dough 107 is exuded through extrusion ports 38a and 38b, the ribbon of dough is severed into a plurality of uniformly sized pieces at the outlet of dough divider 10, in this case extrusion ports 38a and 38b. Cut-off means 50 associated with extrusion ports means 38a and 38b severs the ribbon of dough 107 into pieces of generally uniform length. The length of the severed pieces of dough may be pre-selectably varied by varying the speed of the feed elements. As may be seen from FIGS. 11, 12, 14 and 15, cylindrical cut-off means 50 is provided which is external to and coaxially aligned with cylindrical interchangeable body means 37. As the ribbons of dough 107 and 107a are extruded through extrusion ports 38a and 38b in cylindrical interchangeable body 37, a quantity of dough tends to collect external of the extrusion ports. Cylindrical cut-off means 50 is then moved from the position shown in FIG. 11 to the position shown in FIG. 12, thereby severing the ribbons of dough from the general mass of dough 5 within cylindrical interchangeable body 37 in a reciprocal severing action operated in a generally axial direction with respect to interchangeable body means 37.

Once the ribbons of dough 107 as shown in FIG. 11 have been severed to produce a plurality of uniformly sized pieces 105a and 105b, as shown in FIG. 12, it should be observed that the interior surface of cylindrical cut-off means 50 is exposed to dough which is being forced through extrusion ports 38a and 38b under the influence of secondary feed element 19. Due to the nature of the dough, there is a tendency for some of the dough material to adhere to the interior surface of the cut-off means while it is being returned to the position shown in FIG. 11. In order to prevent the dough which adheres to cylindrical cut-off means 50 from accumulating in the space between the cut-off means and cylindrical interchangeable body 37, self-cleaning means are provided.

In the exemplary embodiment of the present invention shown in FIGS. 11 and 12, self-cleaning means are provided which comprise external relief grooves 36a, 36b, 36c, 36d inter alia, on cylindrical interchangeable body 37 which interact with cooperative port means 44a, 44b, 44c and 44d respectively within cylindrical cut-off means 50. The structural relationship between the external relief grooves and the cooperative port means is most easily seen in FIG. 15.

Once cylindrical cut-off means 50 has severed the ribbons of dough as shown in FIG. 12, it must be returned to the position shown in FIG. 11 in order to allow ribbons of dough 107 to once again be extruded through extrusion ports 38a and 38b. A first self-cleaning of the internal surface 63 of the cut-off means is provided by scraping edges 47a, 47b, 47c, and 47d, inter alia, of extrusion ports 38a, 38b, 38c, and 38d respectively which scrape any adhering dough particles from surface 63 as cut-off means 50 is moved from the position shown in FIG. 12 to the position shown in FIG. 11. Any dough particles which are not removed by the scraping action of scraping edges 47a, 47b, 47c and 47d, will be removed by scraping shoulder 45a, 45b, 45c, and 45d of external relief grooves 36a, 36b, 36c, and 36d respectively. The dough thus removed is deposited in the external relief grooves and is removed therefrom by the scraping action of shoulder 36a, 36b, 36c, and 46d respectively of cooperative port means 44a, 44b, 44c and 44d of cut-off means 50 as it is returned to the position shown in FIG. 11.

To operate cut-off means 50, cam means provide a positive bi-directional reciprocating movement thereof. As is indicated in dotted lines in FIG. 11 and as shown in FIGS. 12 and 15, the cut-off means is securely mounted to shafts 55a, and 55b which are journalled in mounting blocks 52a and 52b respectively and are retained therein by retainers 54a and 54b respectively. Mounting blocks 52a and 52b are fitted into attachment recesses 51a and 51b of moment arm 51 which is pivotally mounted to support frame 1 at pivot 59 as shown in FIG. 1.

To provide a reciprocating movement of moment arm 51, and an attendant reciprocating movement of cut-off means 50, cams 61 and 62, as shown in FIGS. 1, 3, 5, and 6, are provided. Cams 61 and 62 are mounted on connector shaft 76. Connector shaft 76 is journalled in and supported between bearing clocks 76a and 76b and is rotated by means of a drive chain 3c which interconnects sprocket 77b, which is non-rotatably secured to connector shaft 76, and sprocket 77a, which is non-rotatably affixed to drive shaft 103 of motor 3, as may best be seen in FIGS. 1 and 3.

As connector shaft 76 is rotated, cams 61 and 62 which are non-rotatably affixed thereto are also rotated. Cam followers 60a and 60b are rotatably mounted to moment arm 51 and cooperate with cams 61 and 62 respectively to provide a reciprocating movement of moment arm 51 as is best seen in FIGS. 5 and 6.

In operation, the cut-off cycle begins with cut-off means 50 positioned as in FIG. 11 and cams 61 and 62 in the position shown in FIG. 5. Dough is being extruded through extrusion ports 38a and 38b to form ribbons of dough 107a and 107b. As shaft 76 is rotated in the direction shown in FIGS. 5 and 6, cam recess 61b and cam lobe 62b are rotated clockwise relative to cam followers 60a and 60b until cam follower 60a reaches recess 61b and cam follower 60b rides up lobe 62b moving arm 51 to the right and cut-off means 50 from the position shown in FIG. 11 to the position shown in FIG. 12, thereby severing ribbons of dough 107a and 107b into uniformly sized dough pieces 105a and 105b.

As cams 61 and 62 continued to rotate in the direction shown in FIGS. 5 and 6, cam follower 60b tends to ride down cam lobe 61b onto surface 62a. At the same time, cam follower 60a tends to ride out of recess 61b onto surface 61a and in so doing forces moment arm 51 to the left which returns cut-off means 50 to the "open" position shown in FIG. 11, thereby allowing ribbons of dough 107a and 107b to once again be extruded through extrusion ports 38a and 38b. Thus, it may be seen that cams 61 and 62 provide a positive bi-directional reciprocating movement of cut-off means 50.

The length of the time interval during which cut-off means remains in the position shown in FIG. 11 will determine the size of dough pieces 105a and 105b. The length of this time interval is determined by the rate of rotation of connector shaft 76 which, in turn, is controlled by varying the ratio between the number of teeth in sprockets 77a and 77b which are interconnected by drive chain 3c.

Although the present invention contemplates the use of dough divider means 10 in cooperation with an associated dough forming means 70, it should be noted that the dough divider means may be used independently as is shown in FIGS. 26, 27 and 28. As shown in FIGS. 26 and 27, discharge conduits 43, 143, 243, 343, 443 and 543 may be provided adjacent to and external of extrusion ports 38a, 38b, 38c, 38d, 38e and 38f respectively to guide severed pieces of dough 105 to different locations on output conveyor 6 in order to prevent the pieces of dough from contacting each other and becoming stuck together once more into a large mass of dough.

Further, although the present invention contemplates the use of cylindrical cut-off means coaxially aligned with the extrusion means, the present dough divider may be provided with a cut-off blade 56 pivoted at 57 and having cutting edge 158 which is rotated in an arcuate motion to sever a ribbon of dough 107 as is shown in FIGS. 28 and 29.

Dough forming means 70 is mounted to support frame 1 such that dough forming means 70 communicates with dough divider means 10 and engages ribbons of dough 107a and 107b adjacent extrusion ports 38a and 38b and draws portions of the ribbons of dough away from extrusion ports 38a and 38b in an initial drawing operation prior to the severing of the ribbons of dough into dough pieces 105a and 105b by cut-off means 50. A general over-view of an exemplary embodiment of the present invention showing the relationship between dough divider means 10 and dough forming means 70 is shown in FIG. 1 and a detailed view of the operational interaction between dough divider means 10 and dough forming means 70 is shown in FIG. 11.

The exemplary dough forming means 70 of the present invention is provided with endless conveyor means 71a and 71b comprising a plurality of cooperating generally opposed dough manipulating means. As may be seen in FIG. 11, the dough manipulating means of the exemplary embodiment comprises paired opposing individual forming die body elements exemplified by die body elements 80a and 80b which are mounted to conveyor means 71a and 71b and which are provided with internal forming surfaces 86a and 86b respectively. The die body elements are synchronously driven to converge into juxtaposition as shown at 180a and 180b in FIG. 11 and the internal forming surfaces 186a and 186b of die body elements 180a and 180b respectively circumferentially define a zone for receiving and manipulating dough during a portion of each complete cycle of conveyor means 71a and 71b.

As is most clearly shown in FIGS. 11 and 13, die body elements 180a and 180b are mounted to endless conveyors 71a and 71b respectively by means of mounting flanges 181a and 181b respectively. It should be noted that a further exemplary embodiment of the present invention is shown in FIG. 30 wherein abbreviated flange tabs 82a and 82b provide mounting means at an anterior portion of die body elements 80a and 80b respectively for mounting the die body elements to endless conveyor 71a and 71b respectively such that interference between opposing pair members 80a and 80b is minimized as the members converged into juxtaposition as is shown at 180a and 180b of FIG. 30.

To synchronously drive endless conveyors 71a and 71b to converge into juxtaposition, sprocket 75a is non-rotatably mounted with respect to connector shaft 76 which is driven by motor 3 as has been discussed. Sprocket 75a is connected to sprocket 75b by means of drive chain 73 as is shown in FIGS. 3 and 4. Sprocket 75b is non-rotatably mounted to shaft 79b which also non-rotatably mounts sprocket 74b. Shaft 79b is journalled in support frame 1 through bearing 101 and is rotatable therein by drive chain 73 when connector shaft 76 is rotated. As can be seen in FIG. 1, endless conveyor 71b is supported between and driven by sprocket 72b and 172b. Sprocket 72b is non-rotatably mounted to shaft 79b and, as shaft 79b is rotated, endless conveyor 71b is driven in the direction shown.

To synchronize the movement of endless conveyor 71a with the aforedescribed movement of endless conveyor 71b, synchronizing drive chain 74 is mounted between sprockets 74b and 74a. As is shown most clearly in FIG. 3, sprocket 74a is non-rotatably mounted to shaft 79a which is rotatably mounted to support frame 1 by bearing 201. As sprocket 74a is rotated by synchronizing drive chain 74, shaft 79a is rotated and, in turn, drives gear 78a which is non-rotatably mounted thereto. Gear 78a meshes with and drives counter gear 78b which rotates in the reverse direction with respect to gear 78a and which therefore rotates sprocket 72a in a direction counter to the direction of rotation of sprocket 72b. Endless conveyor 71a is supported between and driven by sprockets 72a and 172a and, as sprocket 72a is driven counter to direction of sprocket 72b, and as sprocket 72a drives endless conveyor 71a, it may be seen that endless conveyors 71a and 71b are synchronized such that relative movement therebetween during the portion of their rotational cycles wherein they interact to define dough forming zone 87 is eliminated.

In order to manipulate the dough pieces, a mandrel 90 is provided. Mandrel 90 is generally coaxially positioned within at least a portion of zone 87 which is formed by internal forming surfaces 186a and 186b to provide a relative dough forming movement between the forming surfaces 186a and 186b of opposing die body elements 180a and 180b respectively and mandrel 90.

As the bagel dough shown generally at 5 is extruded through extrusion ports 38a and 38b to form ribbons of dough 107a, 107b respectively, opposing die body elements 80a and 80b converge to form a paired assembly of juxtaposed die body elements shown at 180a and 180b. Internal forming surfaces 186a and 186b cooperate to define forming zone 87 which is coaxially aligned about mandrel 90. Dough ribbons 107a and 107b are engaged by internal forming surfaces 186a and 186b and are drawn generally away from extrusion ports 38a and 38b. Cut-off means 50 severs the ribbons of dough into pieces of dough 105a and 105b which are then transported linearly along mandrel 90 by internal forming surfaces 186a and 186b. As the dough pieces are moved along mandrel 90, a relative dough forming movement takes place between internal forming surface 186a and 186b and mandrel 90. Dough pieces 105 are manipulated in a generally rolling motion and tend to become, generally cylindrical in shape. As adjacent pieces of dough come into contact with each other, the cylindrical pieces tend to be rolled together to form an un-broken toroid of dough which fills a portion of forming zone 87 as may be seen in FIGS. 13, 32, 33 and 34.

Although the exemplary embodiments of the present invention shown in FIGS. 1, 3, 4, 11, 18, and 19 show a continuous series of die body elements which circumferentially define an uninterrupted forming zone, it should be noted that a further exemplary embodiment as shown in FIG. 30 provides a discontinuous series of cooperating generally opposed forming die body elements which are arranged such that the relative dough forming movement between the die body elements and the mandrel is interrupted for a portion of each complete cycle of conveyors 71a and 71b which mount the die body elements. This discontinuous series of die body elements allows the dough to "rest" on the mandrel without being manipulated and therefore reduces the working and kneading action which takes place during the dough forming movement, prevents over-working the dough and assures that the finished bagel will rise properly during baking.

In the alternative exemplary embodiment of the present invention shown in FIG. 30, a two-diameter mandrel 190 is provided which cooperates with modified die body elements 280a and 280b which are provided with converging internal surface means 285a and 285b which converge from a generally larger diameter at a leading edge of die body elements 285a and 285b to a generally smaller diameter internal forming surface 286a and 286b each of which generally defines a portion of forming zone 87. It should be noted that die body elements 280a and 280b are positioned to immediately succeed each interruption in the interrupted sequence of die body elements discussed previously and generally guide the bagel dough back into the forming zone.

Two-diameter mandrel 190 has an enlarged first portion of a generally greater diameter than the main body of the mandrel. As may be seen in FIGS. 30 and 31, mandrel 190 is provided with a frustoconical portion 100 between the enlarged first portion and generally smaller diameter main body portion. Frustoconical portion 100 cooperates with converging internal surfaces 285a and 285b of forming die elements 280a and 280b respectively to provide a uniform spatial relationship therebetween, thereby preventing over-working the dough pieces 105a and 105b during the first forming stages.

In referring to the exemplary embodiment shown in FIG. 31, it may be seen that the height of frustoconical portion 100, as shown at "b", is equal to the length of converging internal surface 285b, as shown at "a". Additionally, the angular deviation of converging internal surface 285b with respect to forming zone 87 is equal and opposite to the angular deviation of frustoconical portion 100. Thus, as die body element 280b progresses in the direction shown, converging internal surface 285b tends to compress dough ribbon 107 against the enlarged first portion of mandrel 190. However, at the same time, frustoconical portion 100 tends to increase the distance between mandrel 190 and converging internal surface 285b at the same rate as it is decreased by the convergence of surface 285b. This constant uniform spatial relationship between the internal forming surface portions of die body elements 280b and mandrel 190 prevents over-working the dough during a relative dough forming movement between the die body element and the mandrel.

It should be noted that in the exemplary embodiment shown in FIGS. 11 and 30, the mandrel is non-rotatably mounted generally coaxially within forming zone 87 and is rigidly attached to interchangable body means 37. Alternate mandrel mounting means are shown in FIG. 16, wherein mandrel 90 is non-rotatably coaxially aligned with forming zone 87 but is not rigidly mounted to interchangeable body means 37. As is shown in FIGS. 16 and 17, mandrel 90 may be mounted to mandrel support elements 99 and 199 which pass through zones 99a and 199a between opposing die body elements 180a and 180b as is most clearly shown in FIG. 17.

A further exemplary embodiment of the present invention, as shown in FIG. 18, provides means for mounting mandrel 90 rotatable about a longitudinal axis generally coaxially aligned within forming zone 87.

Mandrel 90 is rotatably mounted to central shaft 92 which is, in turn, mounted to secondary feed element 19. Central shaft 92 is journalled in bearings 93a and 93b and is generally free to rotate within forming zone 87. However, as dough is introduced into forming zone 87 the friction between the dough and mandrel 90 stops the rotation of the mandrel. Thus, although mandrel 90 is supported and aligned by central shaft 92 which is rigidly mounted to, or an extension of, secondary feed element 19, it is independently rotatable with respect to secondary feed element 19 in order to provide the desired rolling manipulating of the dough during the dough forming process without introducing a twisting manipulation caused by the rotation of element 19 which would tend to over-work the dough.

Further, as may be seen in FIGS. 18 and 19, bagel guide 96 is rotatably mounted with respect to mandrel 90 in order to provide a relatively motionless uniform positioning of bagels 4 on output conveyor 6, as is shown in FIG. 1.

In the exemplary embodiment shown in FIG. 19, it may be seen that terminal block 95 is mounted to a terminal portion of central shaft 92 and retained in position by set screw 95a. Bearing 94 provides a low friction interface between mandrel 90 and terminal block 95 and allows terminal block 95 to be non-rotatably mounted to central shaft 92 while, at the same time, not interferring with the independent rotation of mandrel 90. Bagel guide 96 is journalled in bearing 97 which is retained by set screw 98 and, due to the length and mass of bagel guide 96 tends to remain stationery while terminal block 95 is rotated relative thereto.

Thus, as dough is rolled along mandrel 90 by the action of die body elements 180a and 180b, it is manipulated and formed into a toroidal form, i.e. bagel, and, as the formed bagel is moved beyond the end of mandrel 90, it is direced by bagel guide 96 onto output conveyor 6 as is shown in FIG. 1.

In addition to the embodiments of dough manipulating means which comprise die body elements 80a and 80b, a further exemplary embodiment is shown in FIG. 20. As may be seen, endless conveyor means are provided which comprise a plurality of cooperating generally opposed relatively wide conveyor belts 171a, 171b, and 171c of a relatively flexible material for manipulating the dough. The relatively wide conveyor belts 171a and 171b are supported between and tensioned by pulleys 84b/84c and 84a/84d respectively and are retained in position to define forming zone 87 by generally tubular belt retainer 83. The relatively wide conveyor belts are passed through belt retainer 83 and, as the conveyor belts are tensioned by their respective pulleys, the belts conform to the interior shape of belt retainer 83. Thus, as may be seen in FIG. 21, a circular cylindrical tubular belt retainer 83 will force the conveyor belt to define a generally circular forming zone 87 about mandrel 90 as is shown in FIG. 21. Each of the conveyor belts overlaps at least a peripheral portion of an adjacent conveyor belt, as may be seen in FIG. 21, to provide an uninterrupted dough manipulating surface shown generally at 386 which circumferentially defines the dough forming zone 87. Although the exemplary embodiment shown in FIG. 21 comprises four conveyor belts, it should be understood by those skilled in the art that present invention is not limited to the use of four conveyor belts. An embodiment comprising six conveyor belts is shown in FIG. 22.

It should be noted further that adjustable means shown generally at 69 in FIG. 22a, such as inserts of a non-compressible material, may be provided between overlapping conveyor belts 171a/171b/171c/171d and belt retainer 83 to force the conveyor belts closer to mandrel 90 thereby varying the diameter of forming zone 87 which is defined thereby.

Referring now to FIG. 35, a further embodiment of the present invention is disclosed wherein semi-annular (i.e. horseshoe or U-shaped) pieces of dough are produced which are adaptable for subsequent manipulation into a number of final shaped dough bodies as will be hereinafter described in greater detail. In the embodiment of FIG. 35, the dough divider means generally shown as 310 has body means 337 adapted to cooperate with diverter means 340 to produce a uniform ribbon of dough 407 of generally U-shaped cross section. To accomplish this, extrusion port 338 within body means 337 is a continuous opening extending for approximately 270° around the circumference of body means 337. Diverter means 340 is provided with first urging means 343 for converting the unformed dough 5 into a uniform ribbon of dough 407 having a U-shaped cross section. This can be seen in greater detail with reference to FIGS. 36 and 39. The U-shaped cross section ribbon of dough 407 is extruded through extrusion port 338 where it is severed by cutoff means 350 into a plurality of semi-annular pieces. The semi-annular dough pieces produced by the dough divider means 310 of FIG. 35 are particularly well adapted for subsequent forming into a number of differently shaped dough bodies.

The dough forming means 370 of FIG. 35 is adapted to produce annular shaped dough bodies by first manipulating these semi-annular dough pieces in the center portion thereof to force the center dough into its desired final configuration and the ends of the dough pieces into close proximity and by then manipulating the semi-annular dough pieces over the length thereof to knead the ends together and thereby form an annular dough body. To accomplish this in the preferred manner shown in FIG. 35, endless conveyor means 371 is provided with an alternate embodiment of the die body elements employed heretofore and generally indicated as 379—shown in greater detail in FIGS. 37 and 38. Die body elements 379 comprise a semi-cylindrical bottom die segment 380a carrying hinge means 382a and 382b at opposite upper edges thereof. Quarter cylindrical die segments 380b and 380c are mounted for hinged movement to hinges 382a and 382b respectively. Die segments 380b and 380c are each fitted with tab means 383 adapted to be guided by channels 384 disposed in guide means 385. Guide means 385 is adapted to move die segments 380b and 380c as die body elements 379 move through the forming zone, first into a first position where bottom segment 380a forming surface 386a cooperates with mandrel 390 to manipulate the semi-annular dough pieces in the portion intermediate the two ends thereof whereby the intermediate portion is substantially manipulated into its final shape and the ends are brought in closer proximity to a full annular shape as shown in FIG. 37. Guide means 385 is further adapted to then move die segments 380b and 380c into a second position where the forming surfaces 386a, 386b and 386c of segments 380a, 380b and 380c all cooperate with the mandrel 390 to manipulate the semi-annular dough pieces over the length thereof so that the two ends are kneaded together to form an annular dough body as shown in FIG. 38.

Referring now to FIG. 40, a simplified drawing of apparatus for taking the semi-annular dough pieces produced by the dough divider means 310 of FIG. 35 and producing rod shaped dough bodies therefrom is shown. The rod shaped dough bodies produced by the forming apparatus of FIG. 40 are shown in FIG. 41. In the apparatus of FIG. 40, mandrel 390 is replaced by second urging means 391 adapted to urge the ends of the semi-annular dough pieces apart toward alignment with an axis passing longitudinally through the ends and center of each dough piece. That is, second urging means 391 tends to substantially flatten the semi-annular dough pieces longitudinally transverse of a conveyor belt 393. Conveyor belt 393 forms a first forming surface for the dough piece as it leaves second urging means 391. The dough pieces are carried by conveyor belt 393 in a direction normal to the longitudinal axis mentioned above between conveyor belt 393 and a second forming surface provided by a forming plate 394. After passing between the pair of spaced forming surfaces provided by conveyor belt 393 and forming plate 394, the dough pieces emerge as rod-shaped dough bodies as shown in FIG. 41. While the rod-shaped dough bodies produced by the apparatus of FIG. 40 could be of a bagel dough as heretofore described, to be subsequently formed by further apparatus, it could equally as well be bread dough for rod-shaped bread sticks or pretzel dough for subsequent hand forming into a pretzel shape.

The dough forming apparatus shown in FIG. 42 is adapted to produce cylindrical-shaped dough bodies for subsequent reforming or for such baked goods as English muffins. The apparatus of FIG. 42 accomplishes its forming by urging the semi-annular dough pieces to fold upon themselves in a plane passing through the ends and center thereof and then passing the dough pieces thus folded between a pair of spaced forming surfaces in a direction lying in the plane of folding to form the cylindrical-shaped dough bodies. To accomplish this, second urging means 391' is adapted to urge the two ends of the semi-annular dough pieces to fold upon themselves. Conveyor belt 393' is disposed transverse to the direction of movement of the dough pieces as they leave second urging means 391'. Transverse conveyor belt 393' takes each folded dough piece and moves it between the two surfaces provided by conveyor belt 393' and a transverse forming plate 394' to produce the desired final configuration of cylindrical-shaped dough bodies.

Thus it may be seen that the operation of the apparatus of the present invention provides a method for converting an unformed quantity of dough into a plurality of uniformly sized and shaped dough bodies which comprise the steps of converting an unformed quantity of dough into at least one uniform ribbon of dough; engaging the ribbon in a forming zone moving relative to the ribbon; drawing the ribbon of dough into the forming pieces within the forming zone; and manipulating the dough pieces in the forming zone to provide a plurality of uniformly sized and shaped dough bodies. Additionally, the method may comprise the further steps of manipulating the dough pieces about a relatively stationary mandrel which is generally coaxially aligned within the relatively moving zone in a relative dough forming movement; and interrupting the relative dough forming manipulating for a portion of each dough forming cycle to allow the dough pieces to rest temporarily and prevent the dough pieces from being overworked.

Having thus described exemplary embodiments of an improved apparatus and method for converting an unformed quantity of dough into a plurality of uniformly sized and shaped dough bodies, it should be understood by those skilled in the art that various alternatives and modifications thereof may be made within the scope and spirit of the present invention which is defined by the following claims.

I claim:

1. Apparatus for converting an unformed quantity of dough into a plurality of uniformly sized and shaped dough bodies, comprising:
   (a) dough divider means for converting an unformed quantity of dough into at least one uniform ribbon of dough, moving said ribbon of dough through an outlet, and severing said ribbon of dough into a plurality of uniformly sized pieces at said outlet;
   (b) dough forming means communicating with said dough divider means for drawing said ribbon of dough away from said outlet and rolling said uniformly sized pieces into a shaped dough body; and,
   (c) means for driving said dough divider means and dough-forming means in synchronization such that a portion of said ribbon of dough is drawn away from said outlet by said dough-forming means in an initial drawing operation prior to the severing of said portion of dough from said ribbon by said dough divider means.

2. The apparatus of claim 1, wherein said dough forming means comprises:
   (a) endless conveyor means carrying a discontinuous series of cooperating generally opposing forming die body elements synchronously driven to converge into juxtaposition for circumferentially defining a zone for receiving and manipulating dough during a portion of each complete cycle of said conveyor means; and,
   (b) mandrel means generally coaxially positioned within at least a portion of said zone for providing a relative dough forming movement only between said die body elements and said mandrel means whereby said relative dough forming movement is interrupted for a portion of each complete cycle of said conveyor.

3. The apparatus of claim 1 wherein said dough forming means comprises:
   (a) endless conveyor means comprising a plurality of cooperating generally opposed dough manipulating means synchronously driven to converge into juxtaposition for circumferentially defining a zone for receiving and manipulating dough during a portion of each complete cycle of said conveyor means; and,
   (b) mandrel means generally coaxially positioned within at least a portion of said zone for providing a relative dough forming movement between said generally opposing manipulating means and said mandrel means.

4. The apparatus of claim 2 wherein said series of die body elements comprises:
   paired opposing individual forming die body elements having internal surface means converting from a generally larger diameter opening at a leading edge thereof to a generally smaller diameter forming surface therein which generally defines said zone, immediately succeeding each interruption in said discontinuous series of elements for guiding said dough into said zone.

5. The apparatus of claim 1, wherein said dough forming means comprises:
   endless conveyor means carrying paired opposing individual forming die body elements including mounting means only at an anterior portion of each of said individual forming die body elements for mounting said die body elements to said endless conveyor means whereby interference between opposing pair members as said members converge into juxtaposition is minimized.

6. The apparatus of claim 3, wherein said manipulating means comprises:
   (a) a plurality of relatively wide conveyor belts of a relatively flexible material for manipulating said dough, each of said belts overlapping at least a peripheral portion of an adjacent conveyor belt; and, (b) adjustable means associated with said overlapping conveyor belts for varying an internal diameter of said zone defined thereby.

7. The apparatus of claim 2 wherein: means are provided for mounting said mandrel means rotatable about a longitudinal axis.

8. The apparatus of claim 2 wherein:
  (a) said dough divider means includes means for urging said plurality of severed uniformly sized pieces of dough to be continuous and semi-annular shaped; and,
  (b) said endless conveyor means includes means for moving said die body elements into a first position where said die body elements cooperate with said mandrel to manipulate said semi-annular dough pieces in the portion thereof intermediate the ends thereof whereby said intermediate portion is substantially in its final shape and said ends are brought in closer proximity to a full annular shape and for moving said die body elements into a second position where said die body elements cooperate with said mandrel to manipuate said semi-annular dough pieces over the length thereof whereby the two ends are kneaded together to form an annular dough body.

9. A method for converting an unformed quantity of dough into a plurality of uniformly sized and shaped dough bodies comprising the steps of:
  (a) converting an unformed quantity of dough into at least one uniform ribbon of dough;
  (b) engaging an end of said ribbon of dough in a forming zone moving relative to said ribbon;
  (c) drawing said end of said ribbon of dough into said forming zone in an initial drawing operation;
  (d) severing said end of said ribbon of dough into a dough piece within said forming zone after said initial drawing operation;
  (e) moving said drawn severed dough piece completely into said forming zone;
  (f) repeating steps (b) through (e) to form a plurality of dough pieces within said forming zone; and,
  (g) manipulating said dough pieces in said forming zone to form a plurality of uniformly sized and shaped dough bodies.

10. The method of claim 9 comprising the further steps of:
  (a) manipulating said dough pieces about a relatively stationary mandrel generally coaxially aligned within said moving zone in a relative dough forming movement; and,
  (b) interrupting said relative dough forming manipulation for a portion of each dough forming cycle to allow said dough pieces to rest temporarily.

11. The method of claim 9 including the additional step of:
  urging said ribbon of dough into a shape being U-shaped in cross-section whereby said step of severing produces semi-annular dough pieces.

12. The method of claim 11 wherein said manipulating step comprises the steps of:
  (a) manipulating said semi-annular dough pieces in the center portion thereof to force the center dough to its desired final configuration and the ends of said dough pieces into close proximity; and,
  (b) manipulating said semi-annular dough pieces over the length thereof to knead the ends together and form an annular dough body.

13. The method of claim 11 wherein said manipulating step comprises the steps of:
  (a) urging the ends of said semi-annular dough pieces apart towards alignment with an axis passing longitudinally through the ends and center of each of said dough pieces; and,
  (b) passing the dough pieces from step (a) of this claim between a pair of spaced forming surfaces in a direction normal to said longitudinal axis to form rod-shaped dough bodies.

14. The method of claim 11 wherein said manipulating step comprises the steps of:
  (a) urging said semi-annular dough pieces to fold upon themselves in a plane passing through the ends and center thereof; and,
  (b) rolling the dough pieces from step (a) of this claim between a pair of spaced forming surfaces normal to said plane of folding in a direction lying in said plane of folding to form cylindrical-shaped dough bodies.

* * * * *